United States Patent [19]

Chiba et al.

[11] Patent Number: 4,887,150
[45] Date of Patent: Dec. 12, 1989

[54] DEVICE FOR CONVERTING VIDEO IMAGE SIGNALS TO PRINTING DATA SIGNALS

[75] Inventors: Kazuhiro Chiba; Noriko Bamba, both of Nagaokakyo, Japan

[73] Assignee: Mitsubishi Denki Kabushiki Kaisha, Tokyo, Japan

[21] Appl. No.: 168,942

[22] Filed: Mar. 16, 1988

[30] Foreign Application Priority Data

| Mar. 16, 1987 | [JP] | Japan | 62-60520 |
| Aug. 17, 1987 | [JP] | Japan | 62-203768 |
| Oct. 21, 1987 | [JP] | Japan | 62-267163 |
| Oct. 21, 1987 | [JP] | Japan | 62-267165 |
| Oct. 23, 1987 | [JP] | Japan | 62-268905 |

[51] Int. Cl.$^4$ .................................. H04N 1/46
[52] U.S. Cl. ........................... 358/80; 358/75
[58] Field of Search .......................... 358/80, 75

[56] References Cited

U.S. PATENT DOCUMENTS

| 4,060,829 | 11/1977 | Sakamoto | 358/80 |
| 4,335,398 | 6/1982 | Yamada | 358/80 |
| 4,386,267 | 5/1983 | Yamada | 358/80 X |
| 4,402,007 | 8/1983 | Yamada | 358/80 X |
| 4,656,505 | 4/1987 | Yamada et al. | 358/80 |
| 4,661,843 | 4/1987 | Sekizawa et al. | 358/75 X |
| 4,682,216 | 7/1987 | Sasaki et al. | 358/80 X |

FOREIGN PATENT DOCUMENTS

| 58-178355 | 10/1983 | Japan. |
| 59-123392 | 7/1984 | Japan. |
| 60-220660 | 11/1985 | Japan. |
| 2050106A | 4/1980 | United Kingdom. |
| 2052913A | 4/1980 | United Kingdom. |
| 2104337A | 4/1982 | United Kingdom. |

Primary Examiner—James J. Groody
Assistant Examiner—Mark R. Powell
Attorney, Agent, or Firm—Birch, Stewart, Kolasch & Birch

[57] ABSTRACT

A color converting device for converting R, G and B image signals representing red, green and blue colors, respectively, into a three color or four color printing data indicative of three colors of yellow, magenta and cyan or four colors of yellow, magenta, cyan and black, which device comprises a divider for dividing the image signals into achromatic and chromatic color components for each picture element; a first converter for converting the chromatic color components so divided into a first color conversion data Y1, N1 and C1 representative of the yellow, magenta and cyan colors, respectively; a second converter for converting the achromatic color component into a second color conversion data Y2, M2 and C2, or into a third color conversion data K; an adder for summing the first and second color conversion data Y1, M1, C1, Y2, M2 and C2 together to provide the three color printing data, or an output circuit for outputting both the first color conversion data Y1, M1 and C1 and a third color conversion data K as the four color printing data.

15 Claims, 30 Drawing Sheets

Fig. 23

| | | | | |
|---|---|---|---|---|
| BLACK | K | x | α | (B) |
| | C | x | α | |
| | M | x | α | (D) |
| | Y | x | α | |
| BMIN | x | R−B | G−B | (A) |
| | C | R−B | G−B | |
| | M | R−B | G−B | (C) |
| | Y | R−B | G−B | |
| GMIN | x | R−G | B−G | (A) |
| | C | R−G | B−G | |
| | M | R−G | B−G | (C) |
| | Y | R−G | B−G | |
| RMIN | x | G−R | B−R | (A) |
| | C | G−R | B−R | |
| | M | G−R | B−R | (C) |
| | Y | G−R | B−R | |

| A13 | A12 | A11 | A10 | A9 | A8 | A7 | A6 | A5 | A4 | A3 | A2 | A1 | A0 |

DEVICE FOR CONVERTING VIDEO IMAGE SIGNALS TO PRINTING DATA SIGNALS

BACKGROUND OF THE INVENTION

1. Field of the Invention

The present invention generally relates to a color converting device and, more particularly, to a device for converting a video signal, including R (red), G (green) and B (blue) signals into printing data including Y (yellow), M (magenta) and C (cyan) components or Y, M, C and K (black) components.

2. Description of the Prior Art

Examples of prior art color conversion method and apparatuses therefor are disclosed in, for example, the Japanese laid-open patent publications No. 58-178355 published Oct. 19, 1983; No. 60-220660 published Nov. 5, 1985; and No. 59-123392 published July 17, 1984.

According to the color conversion method disclosed in the first mentioned publication, the following simple matrix calculation is performed to give Y, M and C printing data.

$$\begin{bmatrix} Y \\ M \\ C \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} R \\ G \\ B \end{bmatrix}$$

wherein:

$$\begin{bmatrix} Y \\ M \\ C \end{bmatrix}$$

represents the Y, M and C printing data, $$\begin{bmatrix} R \\ G \\ B \end{bmatrix}$$

represents data of R, G and B signals for each picture element, and $$\begin{bmatrix} a_{11} & a_{12} & a_{13} \\ a_{21} & a_{22} & a_{23} \\ a_{31} & a_{32} & a_{33} \end{bmatrix}$$

represent a color conversion coefficient matrix.

The color conversion method disclosed in the first mentioned publication has a problem in that, since it is not possible to obtain a single color conversion coefficient utilizable to effect an adjustment appropriate to the spectral distribution and the ink transfer characteristic of pigments used in a printing ink, a relatively large error is involved in the color conversion.

The color conversion method disclosed in the second mentioned publication is aimed at substantially eliminating the problem inherent in the color conversion method discussed in the first mentioned publication. This color conversion method makes use of a plurality of sets of color conversion coefficient matrixes designed to give an optimum color conversion for each of a plurality of color space regions, so that a color conversion of favorable color reproducibility can be accomplished by selecting one of the color conversion coefficient matrixes which corresponds to the color space regions to which the R, G and B signals belong and then by carrying out a matrix calculation. Even with this color conversion method, the error in color conversion tends to become large at the boundary at which the color conversion coefficient matrixes are selected.

The color converting device disclosed in the last mentioned publication makes use of a look-up table wherein, by assigning an address to all the combinations of signal intensities r, g and b of the R, G and B image signals, Y, M, C and K color conversion data are stored in correspondence with a combination of the signal intensities r, g and b at such respective addresses. Although this color converting device is effective to give an optimum color reproducibility, there is, however, a problem in that the read-only memory used for the look-up table must have a relatively large capacity.

The color conversion methods and the devices therefor which are disclosed in the second and last mentioned publications will be discussed with the aid of some of the accompanying drawings.

FIG. 29 illustrates a circuit block diagram of the prior art color converting device disclosed in the second mentioned publication, that is, the Japanese laid-open patent publication No. 60-220660. The color converting device shown therein comprises a matrix multiplier 101, a color conversion coefficient matrix table 102 including a plurality of color conversion coefficient matrixes and a selector 103 for selecting one of the color conversion coefficient matrixes.

Assuming that the R, G and B signals are applied to the color conversion coefficient matrix selector 103, the selector 103 identifies, for each picture element, to which a plurality of regions, defined by dividing a color signal space having three axes represented by the respective intensities of the R, G and B signals, the R, G and B signals so applied belong, and then applies an identifying signal to the color conversion coefficient matrix table 102. The color conversion coefficient matrix table 102 is provided with a plurality of color conversion coefficient matrixes corresponding respectively to the regions in the color signal space and, therefore, upon receipt of the identifying signal from the selector 103, supplies one of the color conversion coefficient matrixes which corresponds to the identifying signal to the matrix multiplier 101. The matrix multiplier 101 performs a matrix calculation for each picture element, using the R, G and B signals and the color conversion coefficient matrix that has been selected by the color conversion coefficient matrix selector 103, thereby to provide the Y, M and C printing data.

Since each color conversion coefficient matrix is associated with a limited region within the color signal space and the color conversion coefficient is so selected that the average difference in color between the original image and the printed image can be minimum, the printing data capable of giving a favorable reproducibility can be obtained.

However, even the color conversion method discussed above has a problem in that the error in color conversion tends to be large at the switching point at which the selector 103 selects one of the color conversion coefficient matrixes. Therefore, unless one color conversion coefficient matrix is provided for each of the color attributes, that is, hue, saturation and lightness, represented by each of the R, G and B color signal components of the input video signal, no optimum color conversion can be attained.

A circuit block diagram of the color converting device disclosed in the last mentioned publication, that is, the Japanese laid-open patent publication No. 59-123392 is reproduced in FIG. 30 of the accompanying drawings. This prior art color converting device comprises a read-only memories (ROMs) 100 having respective address terminals to which the R, G and B signals are applied so that the color conversion can be accomplished by way of a table conversion of Y, M and C printing data stored at address locations in the read-only memories.

Generally, it is well known that the R, G and B signals to be converted into the printing data requires a data of 6 bits or more for each picture element. Assuming that this requires 6 bits, the number of addresses for a single color will be $2^{18}$ and one byte (8 bits) will be required for each address for each of the yellow, magenta and cyan colors and, therefore, ROM 100 must have a total capacity of about 6 megabits ($\approx 2^{18} \times 3 \times 8$).

Although the color converting device according to the last mentioned publication is also effective to accomplish an acceptable color conversion as is the case with that described with reference to FIG. 29, not only is the use of the high capacity read-only memory required, but also the preparation of the memory tables requires complicated procedures.

As hereinbefore discussed, according to the prior art color conversion methods and the devices therefor have problems in that a single color conversion coefficient matrix capable of satisfying printing requirements such as the three attributes of color (luminosity, hue and saturation) and the ink transfer characteristic having a non-linear property cannot be obtained, and in that, even when the plurality of the color conversion coefficient matrixes are used, the error in color conversion tends to be large at the boundary of the regions, to which the color conversion coefficient matrixes are allocated, to such an extent that a high fidelity image reproduction can no longer be attained when printed. Moreover, in the color converting device utilizing the table conversion, the read-only memory of relatively large capacity is required, posing a problem associated with the economy.

Accordingly, the present invention has been devised with a view to substantially eliminating the above discussed problems inherent in the prior art color conversion methods and the devices therefor and is aimed at providing an improved color converting device which can give a highly favorable color reproducibility which is simple in construction requiring a memory of relatively small capacity.

SUMMARY OF THE INVENTION

The above described and other objects and features of the present invention can be advantageously accomplished by providing a color converting device which comprises a separating means for separating, for each picture element, each of the R, G and B signals into a chromatic color component and an achromatic color component, respectively; a first color converting means for converting the achromatic color components of the R, G and B signals into first color converted data Y1, M1 and C1; a second color converting means for converting the achromatic color components of the R, G and B signals into second color converted data Y2, M2 and C2 or into a black color converted data K, respectively; and an outputting means for performing respective calculations of $Y=Y1+Y2$, $M=M1+M2$ and $C=C1+C2$ and outputting color printing data of either Y, M and C or Y, M, C and K.

According to the present invention, since an adaptable color conversion method utilizing a plurality of color conversion coefficient matrixes or a separate color conversion method utilizing a table conversion is applied for the color conversion into the color converted data of color components Y1, M1 and C1, not only can correction of the achromatic color components be accomplished with a simple construction, but also printing data of highly favorable color reproducibility can be obtained. Also, since the chromatic color components separated by the separating means become the difference signals $(R-\alpha)$, $(G-\alpha)$ and $(B-\alpha)$, respectively, wherein $\alpha$ represents the achromatic color component separated by the separating means, and the value $\alpha$ corresponds to the minimum value of the R, G and B signals, at least one of the difference signals $(R-\alpha)$, $(G-\alpha)$ and $(B-\alpha)$ becomes zero. Therefore, the color conversion coefficient matrixes for the difference signals $(R-\alpha)$, $(G-\alpha)$ and $(B-\alpha)$ become two-dimensional and the color conversion data for the achromatic color component become one-dimensional, decreasing the number of the matrixes and the data as compared with three-dimensional matrixes for a conversion of the R, G and B signals.

Also, according to a different embodiment of the present invention, the color converting device comprises a dividing means for dividing, at the time of table conversion of the color components, two color components into a second color component $\beta$ which is smaller than the other of the color components and a first color component $\gamma$ which is obtained by subtracting the smaller color component from the greater color component; a converting means for converting the color components into partly color converted data by means of the table conversion; and a synthesizing and adding means for synthesizing and summing these partially color converted data together. With this device, the color components can be individually and independently color-converted and, therefore, the memory of relatively small capacity is sufficient to accomplish a fine adjustment of the color conversion data.

According to a further preferred embodiment of the present invention, the color converting device comprises a dividing means for effecting a bit-plane division of the R, G and B signals into a plurality of groups for the same place when the color components are table-converted; a converting means for converting the color components of each group into partly color converted data of Y, M and C by means of the table conversion; and an adding means for summing these partially color converted data together to provide the printing data of Y1, M1 and C1. Even this device works satisfactorily with the memory of relatively small capacity.

According to a still further preferred embodiment of the present invention, the color converting device comprises a dividing means for dividing the achromatic color component into two achromatic color fractions; a first converting means for effecting a table conversion of one of the two achromatic color fractions into color converted data of Y2, M2 and C2; a second converting means for converting the other of the two achromatic color fractions into a color converted data of K; and an adding means for effecting respective addition of $Y=Y1+Y2$, $M=M1+M2$ and $C=C1+C2$ to provide printing data of Y, M, C and K. With this color converting device, a mixed ink of Y, C and M can be favorably printed after the printing with a black ink and, therefore, a favorable color reproducibility of, for example, dark brown color can be accomplished.

According to a yet further preferred embodiment of the present invention, the color converting device comprises a dividing means for dividing the R, G and B signals, whose picture element is comprised of a data of 6 bits or more, into a plurality of groups so that the bits in the same significant places can belong to the same groups; a converting means for effecting the table conversion of each group into partially color converted data of Yi, Mi and Ci or Yi, Mi, Ci and Ki; and an adding means for adding the partially color converted data together for each group. Even with this device, the use of the memory of relatively small capacity is sufficient to obtain the printing data of highly favorable color reproducibility.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIG. 23 is a diagram showing an example of the contents stored in a memory used in the color converting device of FIG. 22;

DETAILED DESCRIPTION OF THE EMBODIMENT

Figure 1:
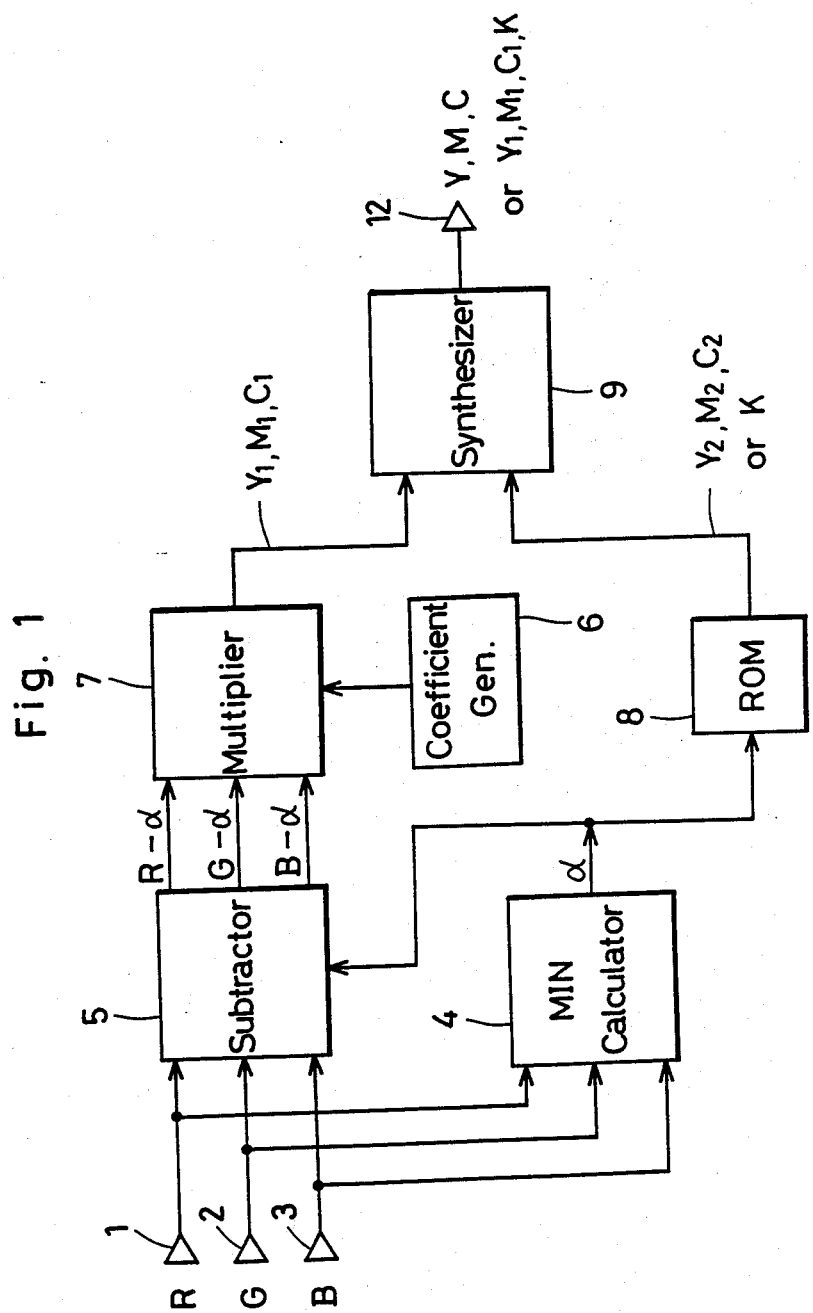
FIG. 1 is a circuit block diagram of a color converting device according to a first preferred embodiment of the present invention.

Before the description of the present invention proceeds, it should be noted that like parts are designated by like reference numerals throughout the several views of the accompanying drawings.

Referring first to FIG. 1 showing a color converting device according to a first preferred embodiment of the present invention, the device is shown as having three input terminals 1, 2 and 3 to which R (red), G (green) and B (blue) signals which have been sampled for each picture element are applied. The input terminals 1, 2 and 3 are coupled to a minimum value calculator 4 which may be comprised of a digital comparator and a selector and is operable to calculate, and generate an output signal indicative of, a minimum value $\alpha$ (=MIN(R, G, B)) for each picture element of the inputted R, G and B signals, and also to a subtractor 5 operable to perform respective subtractions of (R−$\alpha$), (G−$\alpha$) and (B−$\alpha$). The minimum value calculator 4 and the subtractor 5 constitute a dividing means for dividing the image signal into chromatic color components (R−$\alpha$), (G−$\alpha$), (B−$\alpha$) and an achromatic component $\alpha$.

The subtractor 5 is connected with a multiplier 7 operable to perform the following matrix calculation.

$$\begin{bmatrix} Y1 \\ M1 \\ C1 \end{bmatrix} = \begin{bmatrix} b_{11} & b_{12} & b_{13} \\ b_{21} & b_{22} & b_{23} \\ b_{31} & b_{32} & b_{33} \end{bmatrix} \times \begin{bmatrix} R - \alpha \\ G - \alpha \\ B - \alpha \end{bmatrix}$$

Also connected to the subtractor 5 is a coefficient generator 6 in which is stored a plurality of color conversion coefficient matrixes bij (wherein $1 \leq i$, $j \leq 3$) which are so determined in consideration of the spectral distribution characteristics of pigments contained in a printing ink and the ink transfer characteristics of the printing ink that the color difference between the original picture element composed of R, G and B image signals and the eventually printed picture element can be minimum and which are also so determined with respect to the memory color such as the color of the skin that an optimum color reproducibility can be attained by adding a predetermined color component. The coefficient generator 6 and the multiplier 7 constitute a color converting means for the color components.

A read-only memory (ROM) 8 interposed between the minimum value calculator 4 and a synthesizer 9 stores a plurality of color conversion data corresponding respectively to a corresponding stage of lightness of achromatic color components rated from level zero to the maximum level. This ROM 8 constitute a partial color converting means for the achromatic color component operable to output color converting data Y2, M2 and C2 corresponding to the value of $\alpha$ of the achromatic color component inputted from the minimum value calculator 4. The synthesizer 9 adapted to receive the color converting data Y1, M1 and C1 of the chromatic color components inputted from the multiplier 7 and also the color converting data Y2, M2 and C2 of the achromatic color components inputted from ROM 8 is operable to add those data together to provide three color printing data expressed respectively by $Y=Y1+Y2$, $M=M1+M2$ and $C=C1+C2$ to an output terminal 12.

Where the conversion into four color printing data is desired, ROM 8 should additionally store a color converting data K of the lightness which is divided into a plurality of stages, so that the synthesizer 9 can provide the four color printing data based on the color converting data Y1, M1 and C1, inputted from the multiplier 7, and the color converting data K inputted from ROM 8.

The circuit arrangement shown in FIG. 1 operates in the following manner.

Assuming that the R, G and B signals are applied to the respective input terminals 1, 2 and 3, the minimum value calculator 4 calculates the minimum value $\alpha$ of R, G and B signals for each picture element, which minimum value $\alpha$ represents the amount (luminosity) of the achromatic color component. The subtractor 5 determines the differences $(R-\alpha)$, $(G-\alpha)$ and $B-\alpha)$, which differences represent the amounts (hue and saturation) of the chromatic color components for such picture element, at least one of said difference being zero.

The chromatic color components can be classified into three regions; a Y (yellow) region expressed by $(R-\alpha)$ and $(G-\alpha)$ if $(B-\alpha)=0$, an M (magenta) region expressed by $(R-\alpha)$ and $(B-\alpha)$ if $G-\alpha)=0$, and a C (cyan) region expressed by $(G-\alpha)$ and $(B-\alpha)$ if $(R-\alpha)=0$. The coefficient generator 6 outputs the color conversion coefficient matrixes bij with respect to these three regions. The multiplier 7 calculates the Y1, M1 and C1 signals with the use of the color conversion coefficient matrixes bij appropriate to the chromatic color components inputted. ROM 8 stores the lightness (white~gray~black) of the achromatic color component $\alpha$, divided into, for example, 6-bit quantized $0 \leq \alpha \leq 63$, in the form of 3 byte data of Y2, M2 and C2 for each stage, and outputs the color converting data Y2, M2 and C2 appropriate to the value of $\alpha$ inputted from the minimum value calculator 4. In this instance, the required capacity of ROM 8 suffices to be 1536 bits ($=64 \times 3 \times 8$ bits).

The synthesizer 9 operates to sum the color converting data Y1, M1 and C1 and the associated color converting data Y2, M2 and C2 together to provide the three color printing data of Y, M and C, respectively.

Where the conversion into four colour printing data is to be effeced, ROM 8 outputs the color converting data K appropriate to the lightness of the achromatic color component $\alpha$ inputted thereto and, then, the synthesizer 9 provides the four color printing data based on the color converting data Y1, M1 and C1, inputted from the multiplier 7, and the color converting data K inputted from ROM 8.

As hereinbefore described, the embodiment shown in and described with reference to FIG. 1 is such that the R, G and B signals are separated into the chromatic color components and the achromatic color components so that the chromatic color components can be color-converted by means of the calculation performed with the use of the color conversion coefficient matrixes while the achromatic color components can be color-converted by means of an unique table conversion and that the three color or four color printing data are subsequently obtained by synthesizing only those two color converted data. Therefore, with a simple construction, a color conversion of favorable color reproducibility can be accomplished.

The circuit arrangement shown in and described with reference to FIG. 1 may be modified in numerous ways. A first variant thereof is illustrated in FIG. 2, reference to which will now be made.

Figure 2:
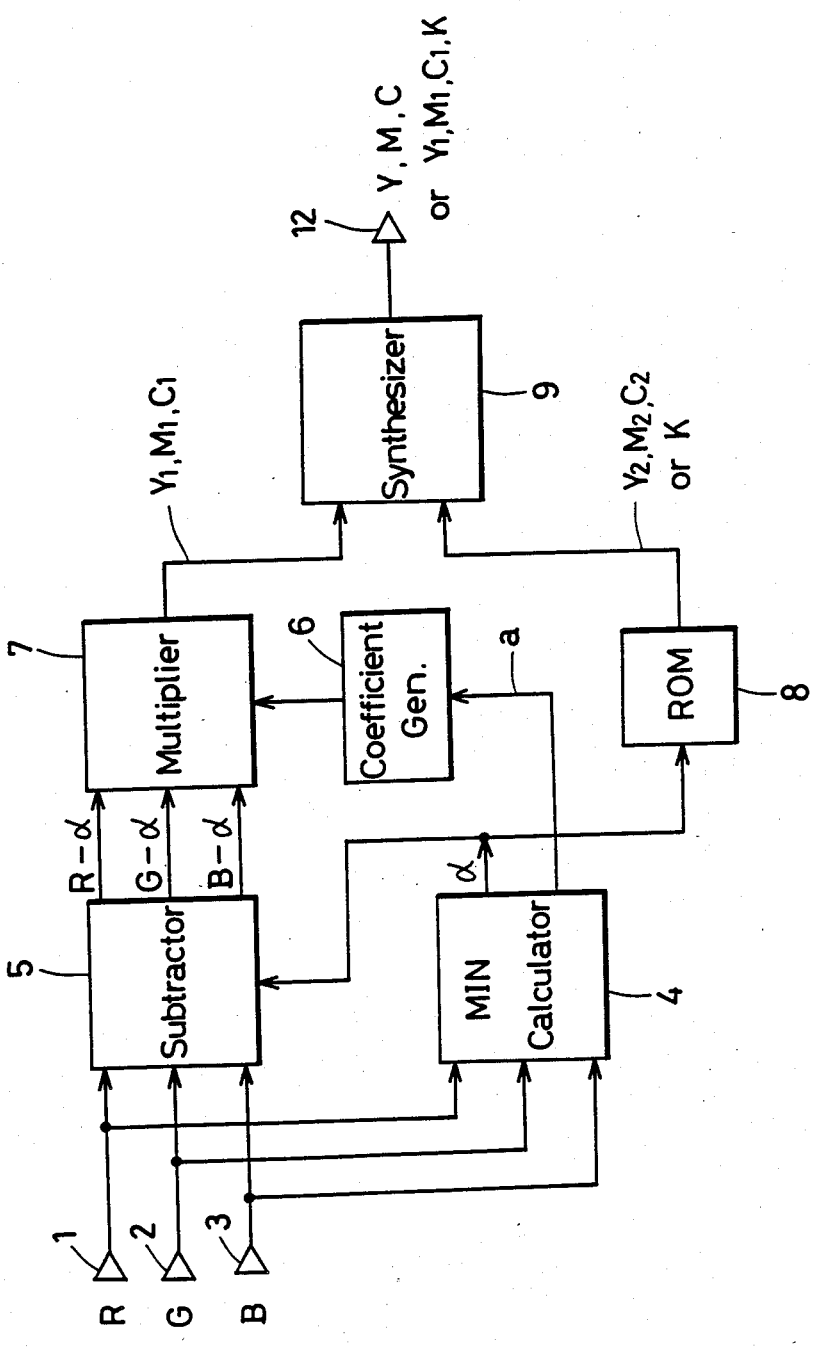
FIGS. 2 to 5 are circuit block diagrams showing respective variants of the color converting device shown in FIG. 1.

The minimum value calculator 4 shown in FIG. 2 is so designed as to provide not only the minimum value $\alpha$ for each picture element of the inputted R, G and B signals, but also a two-bit identifying signal a indicative of which one of the R, G and B signals the minimum value $\alpha$ is associated with. The coefficient generator 6 adapted to receive the identifying signal a from the minimum value calculator 4 has the color conversion coefficient matrix for each of the Y, M and C regions and is operable to effect the conversion with the use of the color conversion coefficient matrix of the relevant region in which the picture element to be converted on the basis of the identifying signal a is included.

According to the variant shown in FIG. 2, a fine adjustment of the color conversion of the chromatic color components can be achieved. It is to be noted that, since one of the $(R-\alpha)$, $(G-\alpha)$ and $(B-\alpha)$ signals of the chromatic color components is "0", the number of the color conversion coefficient bij provided for each color conversion coefficient matrixes suffices to be $2 \times 3 = 6$.

Figure 3:
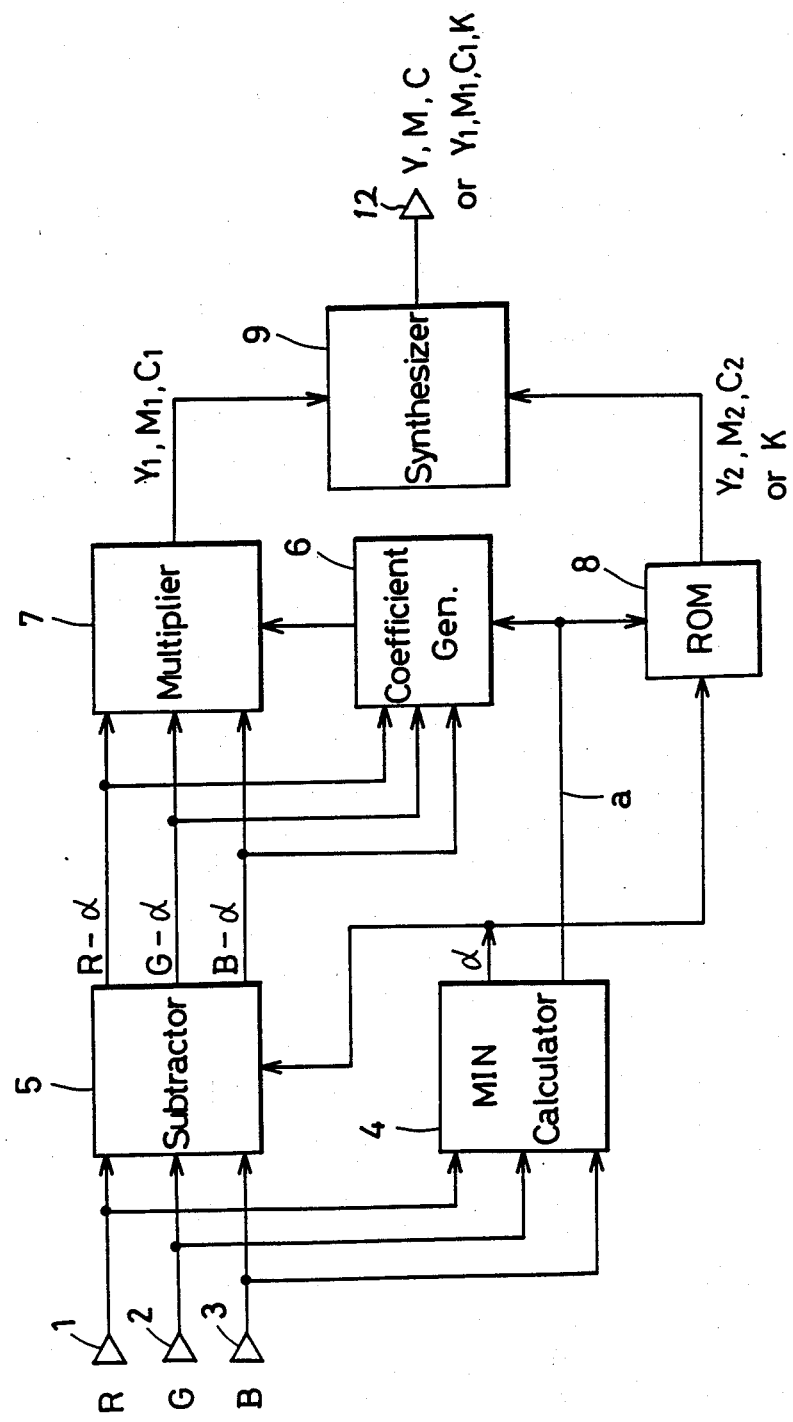

FIG. 3 illustrates a second variant of the embodiment shown in and described with reference to FIG. 1. The outputs from the subtractor 5 which represent the respective differences $(R-\alpha)$, $(G-\alpha)$ and $B-\alpha)$ are applied to the coefficient generator 6 so that the number of the color conversion coefficient matrixes bij to be selected in dependence on a combination of those chromatic color components and the identifying signal a can be increased to accomplish the color conversion of high precision. At the same time, the identifying signal a is applied to ROM 8 so that the achromatic color component $\alpha$ can be color-converted in an optimum fashion with respect to the Y, M and C regions. Even with the variant shown in FIG. 3, the fine adjustment of the color conversion of both of the chromatic color components and the achromatic color components can be accomplished.

As hereinbefore described, in the circuit arrangement according to the variant shown in FIG. 3, the finely adjusted color conversion can be achieved substantially free from color difference, with addition of a minimized number of circuit components.

Figure 4:
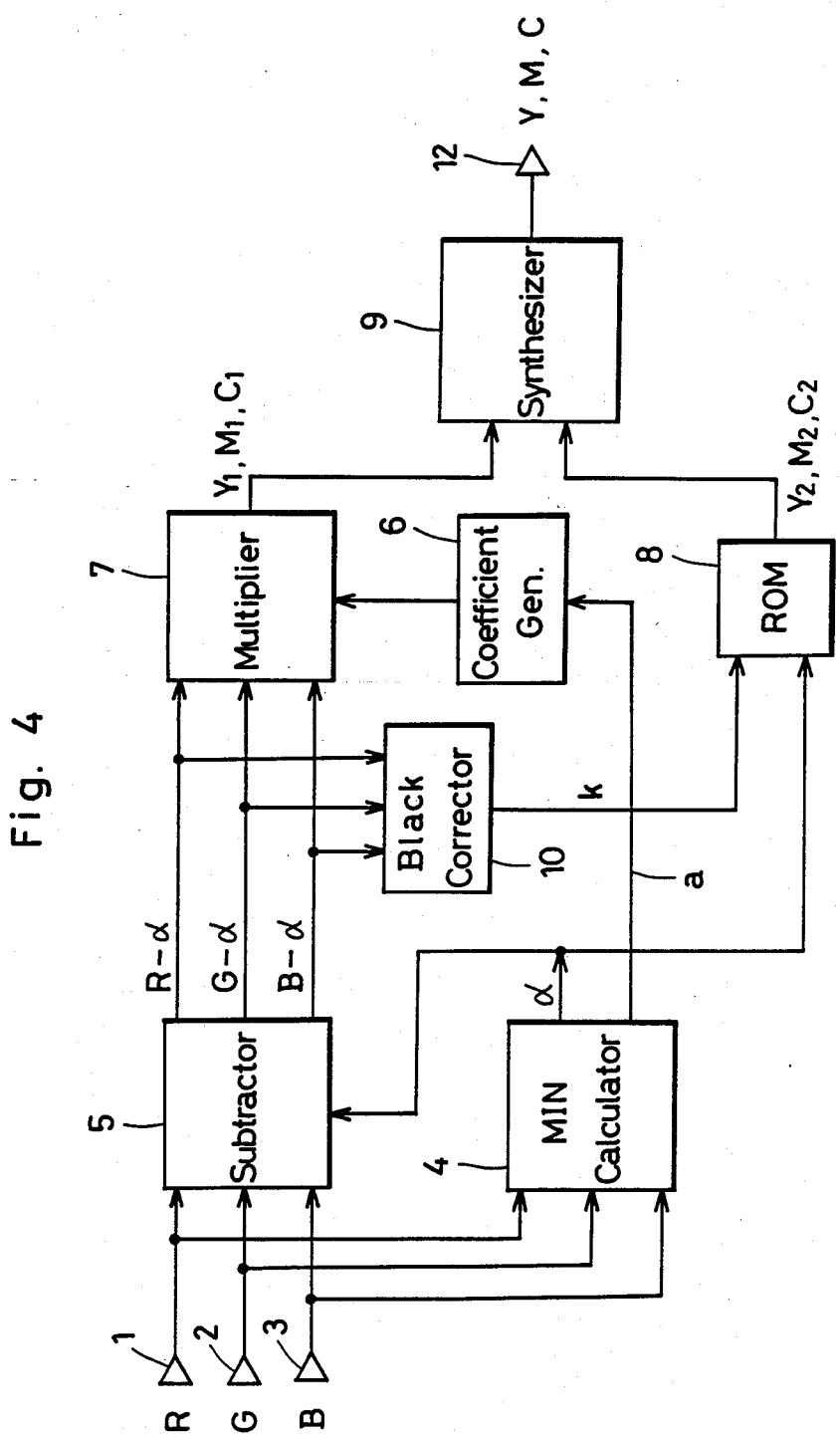

Referring now to FIG. 4 showing a third variant of the circuit arrangement of FIG. 1, reference numeral 10 represents a black color corrector used to extract an achromatic color component k which would be produced, when the color conversion of the chromatic color components is effected, because the printing ink used does not present pure yellow, magenta and cyan. The achromatic color component k so extracted by the black color corrector 10 is applied to ROM 8 which subsequently selects a color conversion table, stored in ROM 8, in dependence on the achromatic color component k and the achromatic color component $\alpha$, supplied from the minimum value calculator 4, thereby to extract the color conversion data Y2, M2 and C2. Acccording to the variant shown in FIG. 4, any possible difference in luminosity between the original picture element composed of R, G and B image signals and the eventually printed picture element which would result from the achromatic color component k can be minimized. It is to be noted that the black color corrector 10 may be comprised of a read-only memory or any other suitable calculating circuit.

Figure 5:
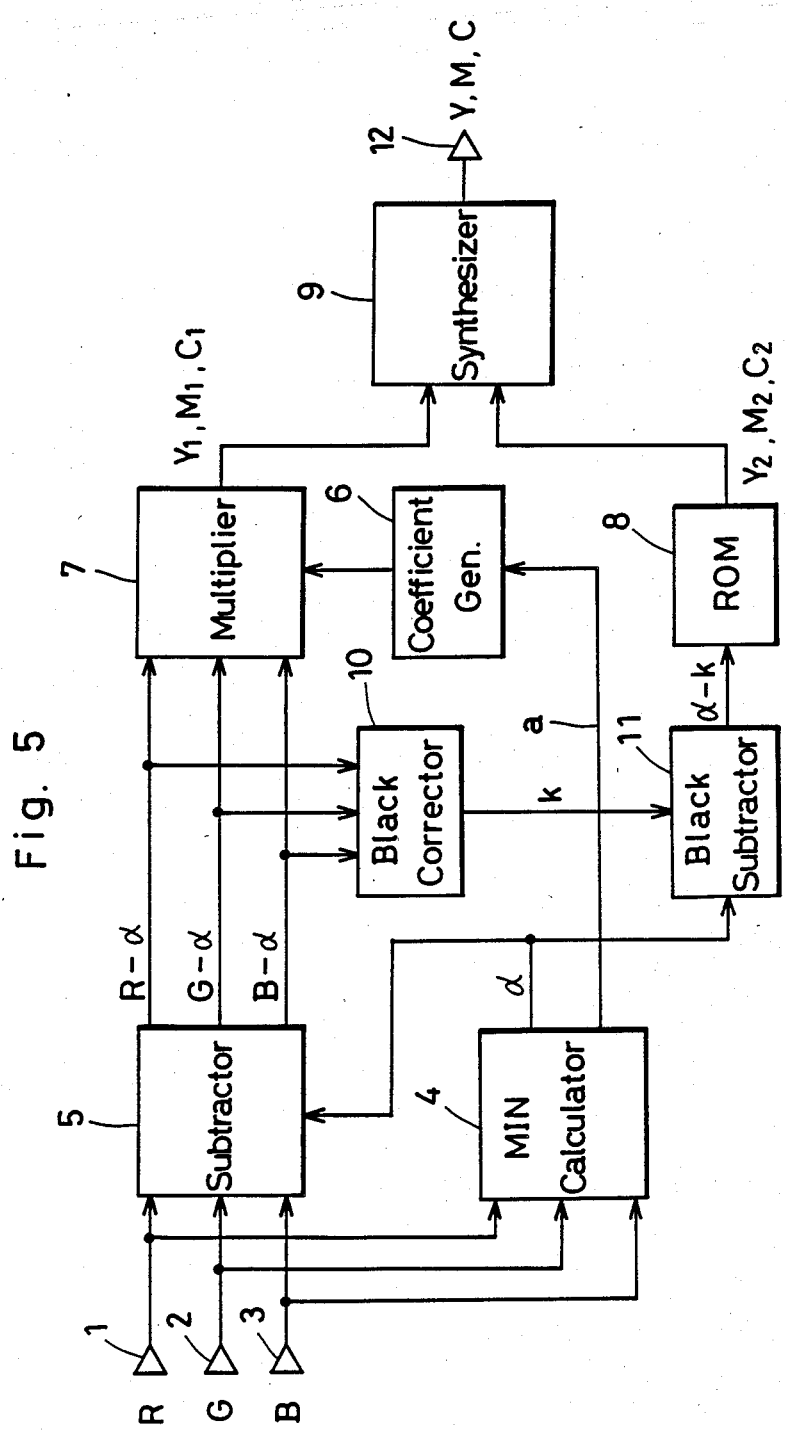

FIG. 5 illustrates a fourth variant of the circuit arrangement of FIG. 1. In the circuit arrangement according to the fourth variant, a black color subtractor 11 is used for subtracting the achromatic color component k from the achromatic color component $\alpha$ so that the achromatic color component represented by the difference $(\alpha-k)$ can be color-converted in ROM 8. Therefore, with addition of a minimized number of circuit components, namely, with addition of the subractor 11, the required capacity of ROM 8 can be decreased while similar effects as those afforded by the circuit arrangement of FIG. 4 can be obtained.

According to any one of the variants shown respectively in FIGS. 4 and 5, although the achromatic color component k included in the chromatic color component has been described as extracted by the black color corrector 10 for the purpose of correcting the achromatic color component $\alpha$, it is possible to store a color conversion coefficient matrix Cij for the black color correction in the coefficient generator 6 so that the color conversion coefficient matrix Cij for the black color correction corresponding to the achromatic color component k can be selected for the correction by the matrix calculation in the multiplier 7.

Thus, according to the first preferred embodiment of the present invention including the first to fourth variants thereof, the R, G and B signals are separated into the chromatic color components and the achromatic color component $\alpha$ for each picture element; the chromatic color components are then converted into color converted data, represented respectively by Y1, M1 and C1 by the matrix calculation with the use of the predetermined color conversion coefficient matrixes; and the printing data, represented respectively by Y=Y1+Y2, M=M1+M2 and C=C1+C2, are outputted by converting the achromatic color component $\alpha$ into color converted data of Y2, M2 and C2 according to the predetermined level of lightness where the three color printing data are desired, or the printing data, represented respectively by Y=Y1, M=M1, C=C1 and K, are outputted by converting the achromatic color components $\alpha$ into the color converted data K appropriate to the lightness thereof. Therefore, the achromatic color component can be corrected with the increased freedom of choice of the color conversion coefficient matrixes, and accordingly the color conversion of excellent color reproducibility can be accomplished.

Also, since one of the chromatic color components $(R-\alpha)$, $(G-\alpha)$ and $B-\alpha)$ is zero, the color conversion coefficient matrixes bij and Cij become two-dimensional. And the color conversion data for the achromatic color component $\alpha$ is one dimensional. Therefore, the capacities of the coefficient generator 6 storing the matrixes bij or Cij and the ROM 8 can be decreased as compared with a coefficient generator storing three dimensinal matrixes for R, G and B signals.

In the foregoing embodiments shown in FIG. 1 to 5, the multiplier 7 and the coefficient generator 6 can be replaced by a single ROM, when the data showing the multiplication of the chromatic color components $(R-\alpha)$, $(G-\alpha)$ and $B-\alpha)$ by the color conversion coefficient matrixes bij are stored in the single ROM.

Figure 6:
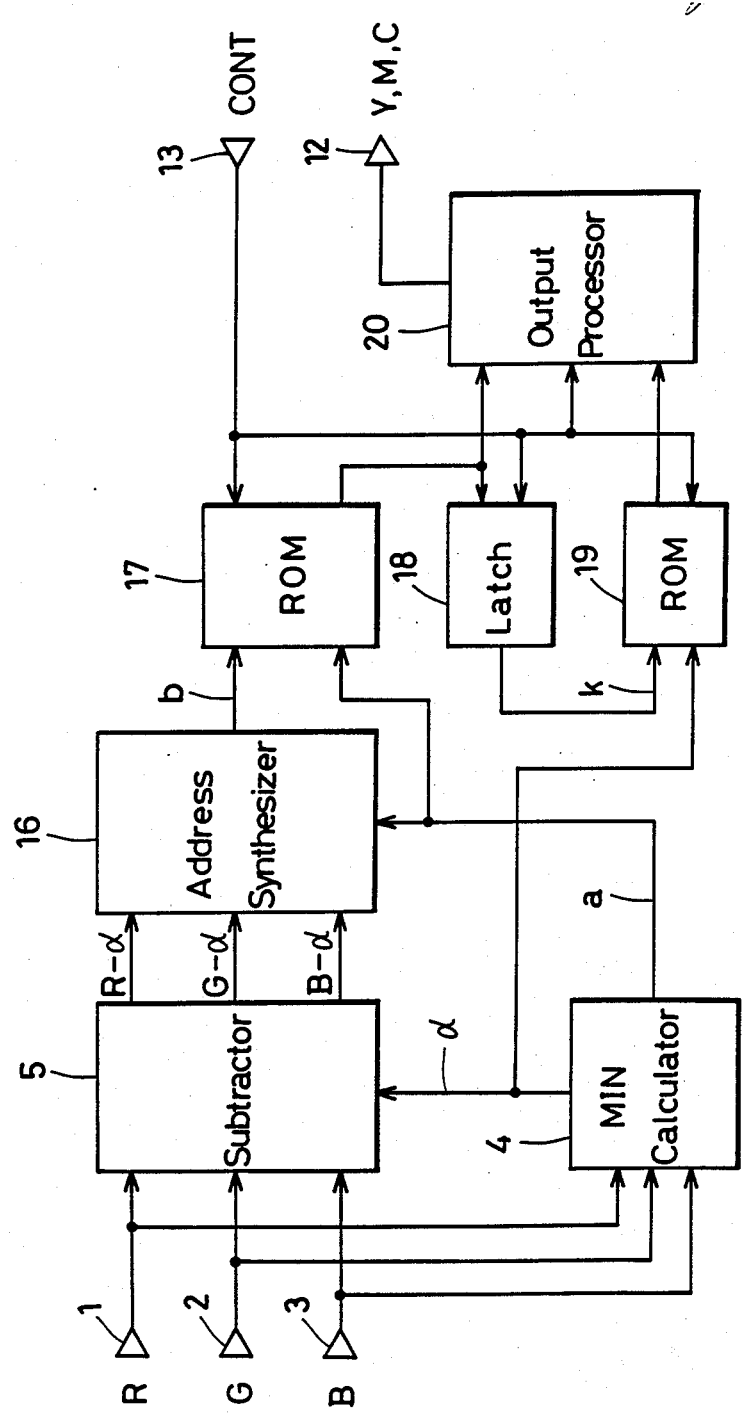
FIG. 6 is a circuit block diagram showing the color converting device according to a second preferred embodiment of the present invention.

FIG. 6 illustrates another preferred embodiment of the present invention. The color converting device according to this embodiment is so designed that the achromatic color component $\alpha$ and the chromatic color components $(R-\alpha)$, $(G-\alpha)$ and $(B-\alpha)$ separated from each other are converted into the respective color converted data according to a table conversion.

Before the details of the color converting device according to this second preferred embodiment of the present invention are described, the principle of color conversion employed in this embodiment will first be described.

As hereinbefore described in connection with the first preferred embodiment of the present invention, the R, G and B signals are separated into the achromatic color component $\alpha$ and the chromatic color component $(R-\alpha)$, $(G-\alpha)$ and $(B-\alpha)$. Of them, at least one of the chromatic color components $(R-\alpha)$, $(G-\alpha)$ and $(B-\alpha)$ has such a characteristic as to become "0". Since $(B-\alpha)=0$ when $\alpha=B$, the chromatic color component $(B-\alpha)$ need not be used as an address, but the remaining chromatic color components $(R-\alpha)$ and $(G-\alpha)$ are used as synthesizing addresses. Similarly, when $\alpha=G$, the chromatic color components $(R-\alpha)$ and $(B-\alpha)$ are used, and when $\alpha=R$, the chromatic color components $(G-\alpha)$ and $(B-\alpha)$ are used. In other words, the chromatic color components are composed of three aggregates of $(R-\alpha)$, $(G-\alpha)$ and $(R-\alpha)$, $(B-\alpha)$ and $(G-\alpha)$, $(B-\alpha)$. The number of synthesizing addresses of these aggregates is $2^{2N}$, and therefore, the number of addresses of all of the chromatic color components will be $2^{2N} \times 3$. Since each address requires 3 bytes of Y, M and C, the required memory capacity will be $9 \times 2^{2N} \times 8$ bits and will be about 295 kilobits when N is 6. On the other hand, the number of addresses for the achromatic color components $\alpha$ will be $2^N$.

In the case where the R, G and B signals are desired to be converted into the four color printing data including Y, M, C and K, the achromatic color component $\alpha$ corresponds to the K printing data and requires a memory capacity of $2^N \times 8 = 512$ bits. In the case of the three color printing data in which K is not included, the printing data of Y, M and C are required for synthesizing, with three colors of Y, M and C, the color corresponding to the printing data of the achromatic color component $\alpha$ and, therefore, each address requires 3 bytes for each of Y, M and C, resulting the necessity of a memory capacity of $2^N$ multiplied by 8 bits which is in turn multiplied by 3 colors, that is, 1536 bits.

However, where an actual printing is carried out with the printing data obtained by converting the chromatic color components and the achromatic color components separately and carrying out the color conversion by synthesizing or selectively outputting, it may happen that, since Y, M and C contained in the printing ink are nor pure colors, unnecessary achromatic color components will shown up resulting in a blackish picture. By way of example, where cyan and magenta are synthesized in order to print in blue, it may happen that, since cyan and magenta include yellow component, the printing result will show a blackish blue color. In order to adjust this, the achromatic color component k produced extraneously upon the color conversion of the chromatic color components are divided into M stages, and the value thereof is read out from ROM together with the color conversion data of Y, M and C so that the amount of the achromatic color components can be adjusted (increased or decreased) according to the address formed from the k and the achromatic color component α. By using this k in this way, the color reproducibility can be further improved, however, the memory for the k requires a capacity of $2^{2N} \times 3 \times 8$ bits.

The memory capacity required to accomplish the above described color conversion will be $2^{2N} \times 72 + 2^N \times 24$ in the case of the conversion into three color printing data and where k is not used, and will be $2^{2N} \times 72 + M \times 2^N \times 24 + 2^{2N} \times 24$ where k of the M stages is used.

Therefore, the memory compression rate P if k is not used will be:

$$P_1 = (2^{3N} \times 24)/(2^{2N} \times 72 + 2^N \times 24).$$

On the other hand, the memory compression rate P if k is rendered to be in M stages will be:

$$P_2 = (2^{3N} \times 24)/(2^{2N} \times 72 + M \times 2^N \times 24 + 2^{2N} \times 24)$$

By way of example, $P_1 \approx 21$ and $P_2 \approx 15$ when $N = 6$ and $M = 2^4$.

Thus, according to the color conversion described above, the memory capacity can be drastically decreased.

Hereinafter the details of the color converting device according to the second preferred embodiment of the present invention will be described with particular reference to FIG. 6.

Reference numeral 16 represents an address synthesizer operable to synthesize an address signal b with the use of two of the outputs from the subtractor 5, that is, the differences $(R-\alpha)$, $(G-\alpha)$ and $(B-\alpha)$, excluding the output which is zero. The address signal b emerging from the address synthesizer 16 is applied to a read-only memory (ROM) 17. Reference numeral 18 represents a latch circuit for temporarily storing a one-byte data, reference numeral 19 represents a read-only memory (ROM), and reference numeral 20 represents an output processor operable to synthesize and sum or selectively output the color converted data, outputted from ROMs 17 and 19. Reference numeral 13 represents an input terminal to which a control signal necessary to execute an operation is applied.

The color converting device according to the second preferred embodiment of the present invention operates in the following manner.

The R, G and B signals each being of 6 bits (if N=6) are separated by the minimum value calculator 4 and the subtractor 5 into the achromatic color component α and the chromatic color components $(R-\alpha)$, $(G-\alpha)$ and $(B-\alpha)$ and the identifying signal a is subsequently generated from the minimum value calculator 4. The address synthesizer 16 makes use of the identifying signal a to synthesize the address signal b, necessary to accomplish the conversion of the chromatic color components, on the basis of the outputs of $(R-\alpha)$, $(G-\alpha)$ and $(B-\alpha)$ from the subtractor 5. By way of example, when $\alpha = B$, $(R-\alpha)$ and $(G-\alpha)$ are used to synthesize the address; when $\alpha = G$, $(R-\alpha)$ and $(B-\alpha)$ are used to synthesize the address; and when $\alpha = R$, $(G-\alpha)$ and $(B-\alpha)$ are used to synthesize the address. The address signal b is a 12 bit signal with the former of the paired signals placed in higher significant 6 bit places and with the latter of the same paired signals placed in lower significant 6 bit places.

Then, with the aid of the table conversion in ROMs 17 and 19, partially color converted data of the chromatic color components and the achromatic color components are determined.

More specifically, in ROM 17 for converting the chromatic color components in which the partially color converted data are accommodated, for each address four color conversion data for yellow Y, magenta M, cyan C and black k are allocated and three pieces of 12 bit aggregates in total are written in this ROM 17. Accordingly, the memory capacity is $4 \times 8 \times 2^{12} \times 3 \approx 393$ kilobits.

Also, ROM 19 for converting the achromatic color components has $2^6$ addresses with 3 bytes of yellow Y, magenta M and cyan C allocated per one address. However, as described hereinbefore, because of the presence of the extraneous achromatic color component k, the number of the addresses has to be increased by an increment corresponding the the value of k where the address is to be synthesized with k and α, thereby forming ROM 19.

ROM 17 upon receipt of the address signal b for the conversion of the achromatic color component determined in the manner as hereinbefore described, the identifying signal a representing the minimum signal and a 2 bit identifying signal for identifying Y1, M1, C1 and k included in the control signal applied from the input terminal 13, operates to determine k which is in turn temporarily stored in the latch circuit 18. Then, the color conversion data Y1, M1 and C1 are determined.

ROM 19 upon receipt of the output k from the latch circuit 18, the achromatic color component α and an identifying signal for identifying Y2, M2 and C2, operates to determine the achromatic color conversion data Y2, M2 and C2. These partial color conversion data from ROMs 17 and 19 are then supplied to the output processor 20 which executes the respective calculationns of $Y = Y1 + Y2$, $M = M1 + M2$ and $C = C1 + C2$ to provide the printing data of Y, M and C.

Figure 7:
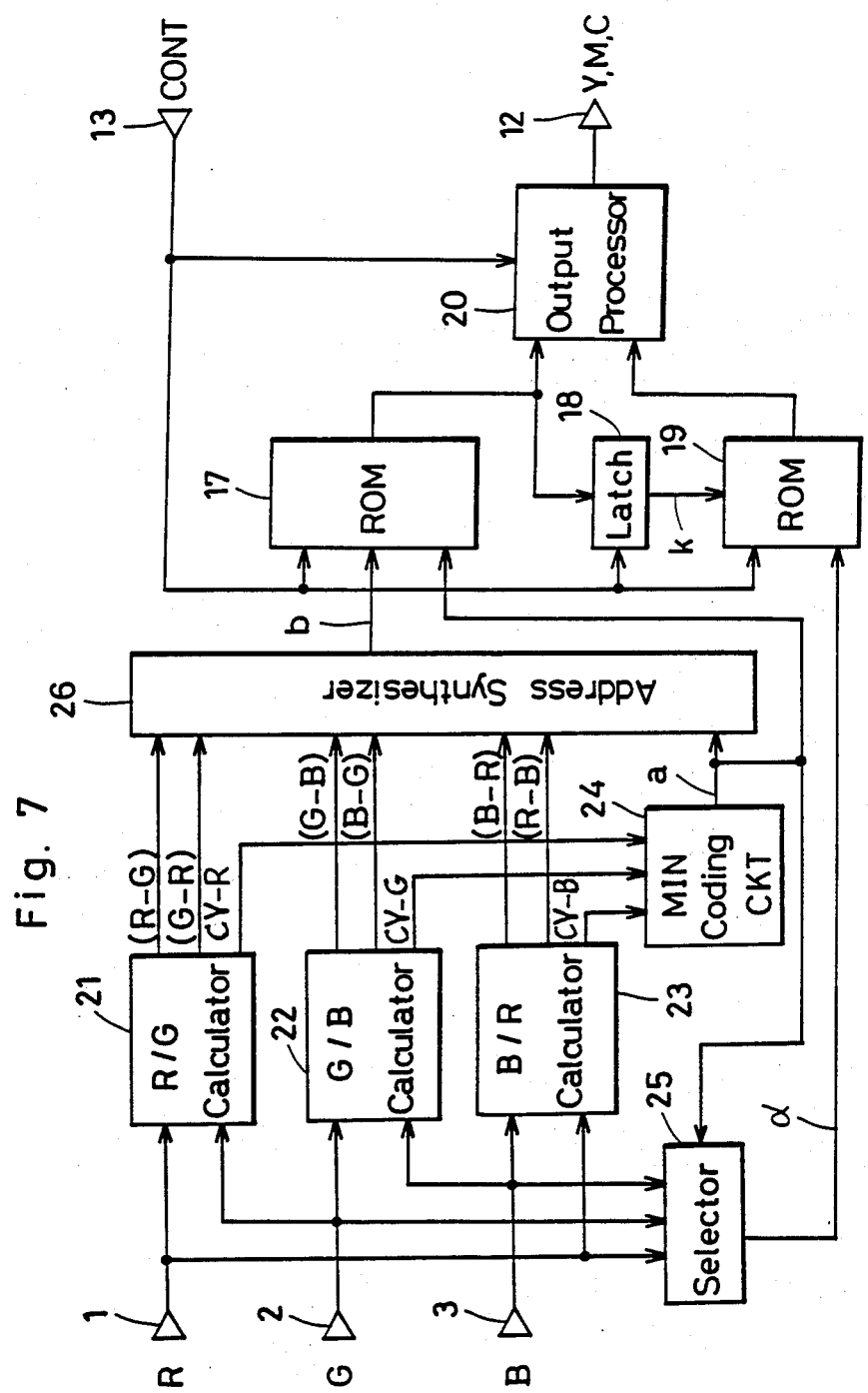
FIG. 7 is a circuit block diagram showing a variant of the color converting device of FIG. 6.

The color converting device shown in and described with reference to FIG. 6 may be modified as shown in FIG. 7, reference to which will now be made.

In FIG. 7, reference numerals 21, 22 and 23 represent a R/G calculator, a G/B calculator and B/R calculator, each operable to effect a subtraction between two inputs applied thereto and then to integrate to provide an output. Reference numeral 24 represents a MIN coding unit for providing the identifying signal a indicative of which one of the R, G and B signals have shown a minimum value. Reference numeral 25 represents a selector for determining the minimum value α of the R, G and B signals, and reference numeral 26 represents an address synthesizer for synthesizing the address signal b for the color conversion. It is to be noted that the other circuit components shown in FIG. 7 are identical with those shown in FIG. 6 and, therefore, the details thereof will not be reiterated for the sake of brevity. The color converting device of the construction shown in FIG. 7 operates in the following manner.

Of the R, G and B signals applied to the respective input terminal 1, 2 and 3, the R and G signals are applied to the R/G calculator 21; the G and B signals are applied to the G/B calculator 22; and the B and R signals are applied to the B/R calculator 23. Each of the calculators 21 to 23 may be comprised of an inverter and an adder. The calculator 21 provides outputs indicative of the respective results of calculation of (R−G) and (G−R) to the address synthesizer 26; the calculator 22 provides outputs indicative of the respective results of calculation of (G−B) and (B−G) to the address synthesizer 26; and the calculator 23 provides outputs indicative of the respective results of calculation of (B−R) and (R−B) to the address synthesizer 26. At the same time, the calculators 21 to 23 provide respective carry signals (CY−R), (CY−G) and (CY−B) which are applied to the MIN coding unit 24.

The MIN codinng unit 24 operates to synthesize and output the identifying signal a indicative of the minimum value of the carry signals (CY−R), (CY−G) and (CY−B) to the selector 25 which then selects and outputs the minimum value $\alpha$ of the R, G and B signals. The address synthesizer 26 outputs, as the color conversion address signal b, the synthesized signal of (G−B) and (R−B) if $\alpha$=B, the synthesized signal of (R−G) and (B−G) if $\alpha$=G, or the synthesized signal of (G−R) and (B−R) if $\alpha$=R. The process so far described provides the three signals a, b and $\alpha$ which are identical with those described in connection with the embodiment of FIG. 6 and, therefore, these signals are processed in a manner substantially identical with that described in connection with the embodiment of FIG. 6, thereby to provide the printing data Y, M and C.

Although in describing the embodiment of FIG. 6 and the variant thereof shown in FIG. 7 reference has been made to the formation of the three color printing data Y, M and C, the concept of the present invention can be equally applied to the preparation of the four color printing data Y, M, C and K, in which case the data in the memory 19 has to be only a black data and the output processor 20 has to be so designed as to carry out a selective switching operation, not the addition referred to in the foregoing description.

It is eventually pointed out that a series of experiments have revealed that, even if one bit out of the number of bits of the chromatic color component is removed relative to the number of bits of the achromatic color component, the quality of the eventually printed picture would not be noticeably reduced. In view of this, if the number of bits of the chromatic color component is decreased to 5 bits per signal, the number of addresses for the chromatic color component can be compressed from 12 bits to 10 bits, permitting the use of the memory having a capacity of 128 kilobits. Accordingly, as compared with the prior art, the rate of compression P can be increased, permitting a drastic reduction in memory capacity.

Also, in any one of the embodiment of FIG. 6 and the variant thereof shown in FIG. 7, design has been made to input the extraneous achromatic color component K and the achromatic color component $\alpha$ to ROM 19 as the address signal. However, if a subtractor for determining the difference between $\alpha$ and k is additionally used, a signal indicative of the difference of ($\alpha$-k) may be inputted as the address signal to ROM 19.

Furthermore, while ROMs 17 and 19 have been shown as separated from each other, a single read-only memory may be employed in which case a selector means and a latch means for Y1, M1 and C1 are used in the front and rear stages of the single read-only memory, respectively.

Yet, while in any one of the embodiment of FIG. 6 and the variant thereof shown in FIG. 7, design has been made to output the Y, M and C printing data in sequence from the output terminal 12, arrangement can be made to provide the Y, M and C printing data at the same time to corresponding one of three output terminals.

As hereinbefore described, according to the second preferred embodiment of the present invention, the color converting device is so constructed as to divide the R, G and B signals into the chromatic color components and the achromatic color components, to determine the partial color conversion data by means of table conversion for each of the chromatic and achromatic color components and to synthesize or selectively output the printing data. Accordingly, the use of the memory of a practically acceptable capacity suffices to provide the color converting device capable of performing the color conversion while exhibiting a favorable color reproducibility.

Figure 8:
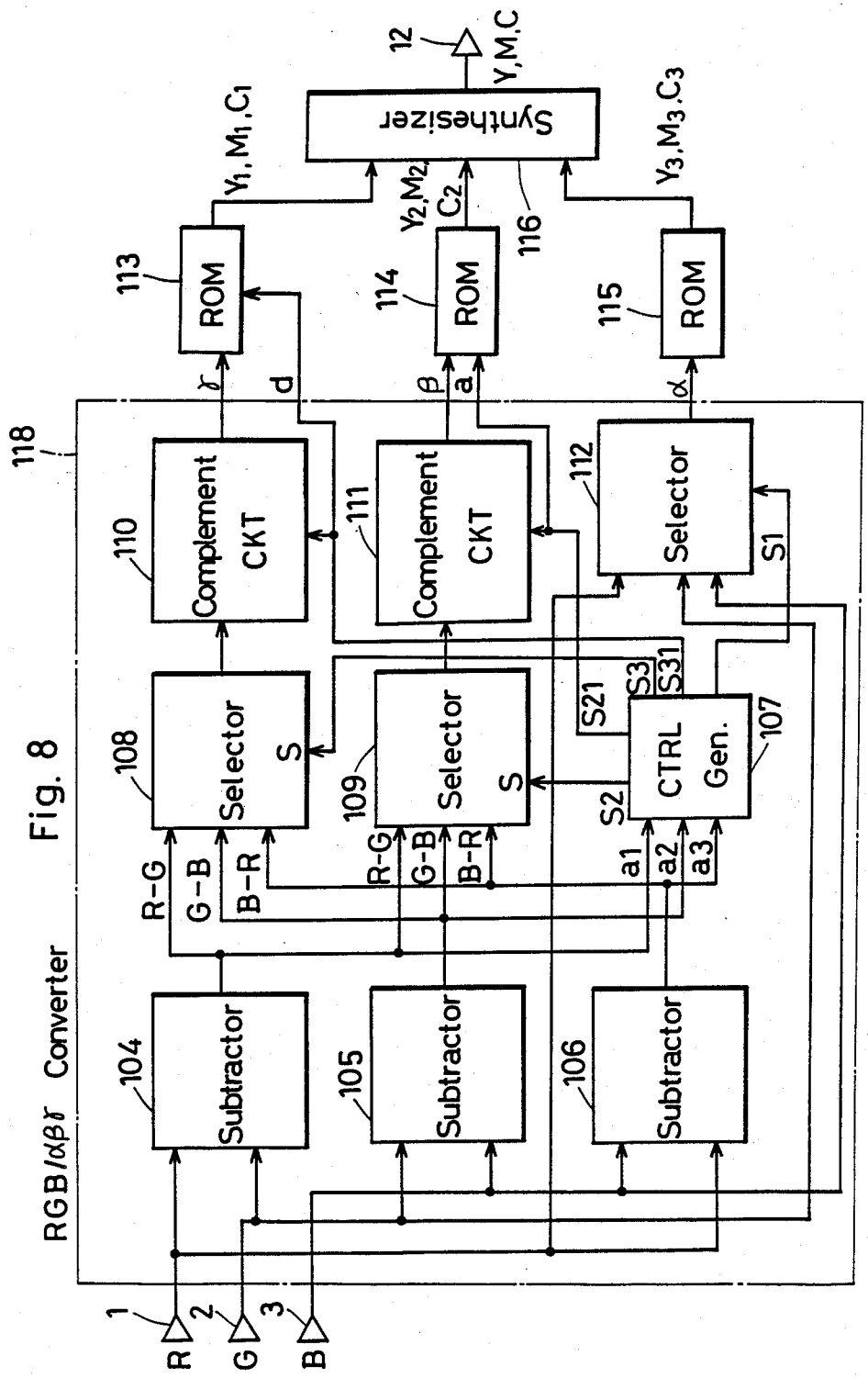
FIG. 8 is a circuit block diagram showing the color converting device according to a third preferred embodiment of the present invention.

The color converting device according to a third preferred embodiment of the present invention shown in FIG. 8 is so designed as to divide the chromatic color component into two fractions so that the partial color conversion can be carried out. Referring now to FIG. 8, reference numerals 104, 105 and 106 represent respective subtractors for performing associated subtractions of (R−G), (G−B) and (B−R). Reference numeral 107 represents a control signal generator operable to compare the magnitude of each of the R, G and B signals for each picture element and to synthesize and output associated selection signals S1, S2 and S3. Reference numerals 108 and 109 represent respective selectors to which the selection signals S3 and S2 are applied from the control signal generator 107, respectively, for selecting one of (R−G), (G−B) and (B−R). Reference numerals 110 and 111 represent respective 2's complement circuits operable to provide corresponding complement data of 2 with respect to associated output data of the selectors 108 and 109. Whether or not it should be the data of the complement of 2 is determined by selection signals S21 and S31 applied from the control signal generator 107 to the respective 2's complement circuits 110 and 111. Reference numeral 112 represents a selector for selecting a minimum value signal of the R, G and B signals for each picture element. Reference numerals 113, 114 and 115 represent respective ROMs for effecting the associated partial color conversion by means of table conversion. Reference numeral 116 represents a synthesizer for synthesizing the partial color conversion data which has been converted in ROMS 113, 114 and 115. It is to be noted that the subtractors 104 to 106, the selectors 108 and 109, the control signal generator 107 and the 2's complement circuits 110 and 111 and the selector 112 altogether constitutes an RGB/$\alpha\beta\gamma$ converter 118 operable to convert the R, G and B data into the achromatic color component $\alpha$ and first and second chromatic color components $\beta$ and $\gamma$.

Figure 9:
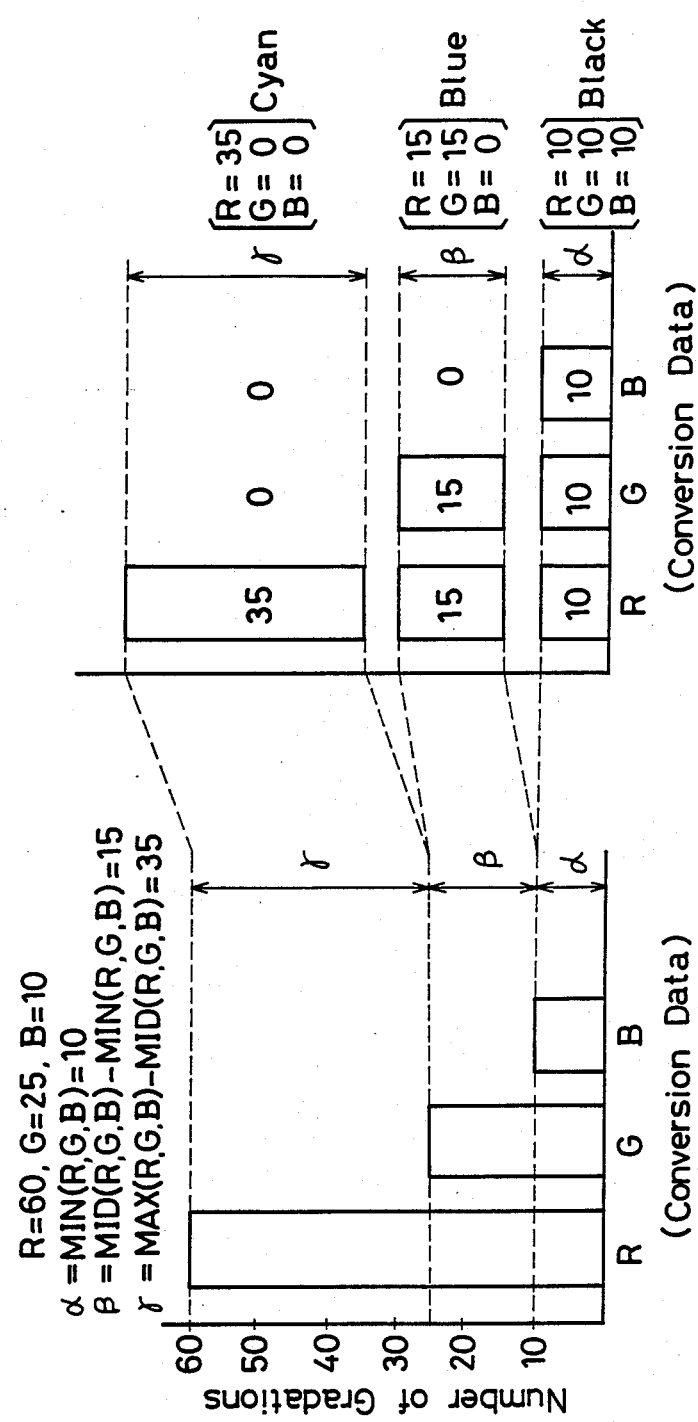
FIG. 9 is a diagram showing an example of division into an achromatic color component and first and second color components.

FIG. 9 illustrates an example of, in the circuit arrangement of FIG. 8, conversion from the values of the R, G and B signals for a certain picture element into three values of the achromatic color component $\alpha$, the first chromatic color component β and the second chromatic color component γ.

The operation of the color converting device shown in and described with reference to FIG. 8 will now be described.

The R, G and B signals applied respectively to the input terminals 1, 2 and 3 are inverted versions of R, G and B signals used in, for example, a television signal, and the picture will be white when all of the R, G and B signal assume a value of "0" and will be black when all of them assume a maximum value. The R, G and B signals so inputted to the input terminals 1, 2 and 3 are supplied to the converter 118. It is to be noted that α represents a minimum value (α=MIN(R, G, B)) among the R, G and B signals for a certain picture element. Since α represents a value of the same value α extracted from each of the R, G and B signals as shown in FIG. 9, extracted components α of the R, G and B signals are equal to each other and, therefore, α represents a value indicative of the gradation of the white to black achromatic color. Therefore, α is referred to as the achromatic color component.

On the other hand, β represents β=MID(R, G, B)−MIN(R, G, B), wherein MID represents a value intermediate of the R, G and B signals. Although β is constituted by two colors other than the minimum value, it will exhibit red which is a complement of (G+B) when the R signal is of a minimum value; green which is a complement of (R+B) when the G signal is of a minimum value; or blue which is a complement of (R+G) when the B signal is of a minimum value. At this time, the identifying signal a indicative of what the minimum value is is outputted together with the signal β. Also, γ represents γ=MAX(R, G, B)−MID(R, G, B) and is constituted by one color of the maximum value. Accordingly, when the maximum value is represented by the R signal, when the maximum value is represented by the G signal or when the maximum value is represented by the B signal, γ exhibits cyan which is a complement of red color, magenta which is a complement of green color or yellow which is a complement of blue, respectively. A signal d indicative of which one of the R, G and B signals has exhibited the maximum value is outputted together with the signal γ.

By way of example, the R, G and B signals shown in FIG. 9 are composed of 60 gradations of R signals, 25 gradations of G signals and 10 gradations of B signals, these can be divided into 10 gradations of black color (the achromatic color component α), 15 gradations of blue color (the first chromatic color component β) and 35 gradations of cyan color (the second chromatic color component γ).

The achromatic color components α and the first and second chromatic color components β and γ are separately supplied to ROMs 113, 114 and 115 by which they are converted into partial color conversion data by means of the table conversion. Assuming that R, G and B signals are each composed of 6 bits, ROM 113 is required to have a memory capacity of 64 bytes multiplied by 3 (d=R, G, B) which is multiplied by 3 (Y, M, C), that is, 576 bytes; ROM 114 is required to have a memory capacity of 64 bytes multiplied by 3 (a=R, G, B) which is multiplied by 3 (Y, M, C), that is, 576 bytes; and ROM 115 is required to have a memory capacity of 64 bytes multiplied by 3 (Y, M, C), that is, 192 bytes. In total, the memory capacity required in the color converting device as a whole is 1,344 bytes.

Then, the partial color conversion data Y1, M1 and C1 obtained by convertingg the second chromatic color component γ within ROM 113, the partial color conversion data Y2, M2 and C2 obtained by converting the first chromatic color component β within ROM 114 and the partial color conversion data Y3, M3 and C3 obtained by converting the achromatic color component α within ROM 115 are summed together by the synthesizer 116 to provide as its outputs Y=Y1+Y2+Y3, M=M1+M2+M3, and C=C1+C2+C3 to the output terminal 12, thereby completing the color conversion.

The details of RGB/α β γ converteer 118 will now be described.

As hereinbefore described, the subtractors 104, 105 and 106 perform respective subtractions of (R−G), (G−B) and (B−R). At this time, a decision can be accomplished to determine which one of two signals is greater by negative or positive sign of the result of each subtraction, because the difference given by each of the subtractors 104 to 106 may take either a negative value or a positive value. By way of example, if the difference (R−G) takes a positive value or zero, R will be equal to or greater than G. On the other hand, if it takes a negative value, R will be smaller than G. Whether the difference has taken a positive value or whether it has taken a negative value can be determined in terms of carry bit which will be "0" or "1" when the difference results in the positive value or the negative value, respectively. The subtractors 104 to 106 adds one code bit to the R, G and B signals when they perform the respective subtractions. Assuming that the code bit for the difference (R−G), the code bit for the difference (G−B) and the code bit for the difference (−R) are expressed by a1, a2 and a3, respectively, the relationships of the differences to the code bits can be tabulated as follows.

| a1 | | a2 | | a3 | |
|---|---|---|---|---|---|
| 0 R−G ≧ 0 | R ≧ G | 0 G−B ≧ 0 | G ≧ B | 0 B−R ≧ 0 | B ≧ R |
| 1 R−G < 0 | G > R | 1 G−B < 0 | B > G | 1 B−R < 0 | R > B | component γ).

Where the code bits a1, a2 and a3 are combined, the relationships will be such as tabulated below.

| a1 | | a2 | | a3 | | | MAX | MID | MIN | Remarks |
|---|---|---|---|---|---|---|---|---|---|---|
| 0 | R ≧ G | 0 | G ≧ B | 0 | B ≧ R | R = G = B | R | G | B | * |
| 0 | R ≧ G | 0 | G ≧ B | 1 | R > B | R ≧ G ≧ B | R | G | B | R ≠ B |
| 0 | R ≧ G | 1 | B > G | 0 | B ≧ R | B ≧ R ≧ G | B | R | G | B ≠ G |
| 0 | R ≧ G | 1 | B > G | 1 | R > B | R > B > G | R | B | G | |
| 1 | G > R | 0 | G ≧ B | 0 | B ≧ R | G ≧ B ≧ R | G | B | R | G ≠ R |
| 1 | G > R | 0 | G ≧ B | 1 | R > B | G > R > B | G | R | B | |
| 1 | G > R | 1 | B > G | 0 | B ≧ R | B > G > R | B | G | R | |

| a1 | | a2 | | a3 | | MAX | MID | MIN | Remarks |
|---|---|---|---|---|---|---|---|---|---|
| 1 | G > R | 1 | B > G | 1 | R > B | Not exist | — | — | — |

*No specific order of R, G and B

Thus, it is possible to select MAX(R, G, B), MID(R, G, B) and MIN(R, G, B) in reference to the respective values of the code bits a1, a2 and a3. In view of $\alpha = $MIN(R, G, B), $\beta = $MID(R, G, B)$-$MIN(R, G, B) and $\gamma = $MAX(R, G, B)$-$MID(R, G, B), the relationships between the code bits a1, a2 and a3 and the color component data $\alpha$, $\beta$ and $\gamma$ are such as tabulated below.

| a1 | a2 | a3 | MAX | MID | MIN | $\alpha$ | $\beta$ | $\gamma$ |
|---|---|---|---|---|---|---|---|---|
| 0 | 0 | 0 | R | G | B | R/G/B | 0 | 0 |
| 0 | 0 | 1 | R | G | B | B | G-B | R-G |
| 0 | 1 | 0 | B | R | G | G | R-G | B-R |
| 0 | 1 | 1 | R | B | G | G | B-G | R-B |
| 1 | 0 | 0 | G | B | R | R | B-R | G-B |
| 1 | 0 | 1 | G | R | B | B | R-B | G-R |
| 1 | 1 | 0 | B | G | R | R | G-R | B-G |
| 1 | 1 | 1 | — | — | — | — | — | — |

The control signal generator 107 generates the selection signal S1 for the achromatic color component $\alpha$, the selection signal S2 for the first chromatic color component $\beta$ and the selection signal S3 for the second chromatic color component $\gamma$ so that the color component data $\alpha$, $\beta$ and $\gamma$ can take respective values shown in the above table, which signals S1 to S3 are respectively applied to the selectors 112, 109 and 108 to permit the latter to select from (R$-$G), (G$-$B) and (B$-$R). At this time, since (G$-$R), (B$-$G) and (R$-$B) can be considered equal to $-$(R$-$G), $-$(G$-$B) and $=$(B$-$R), respectively, the complement of 2 is determined after (R$-$G), (G$-$B) and (B$-$R) have been selected. While these two determinations of the 2's complement are carried out by the 2's complement circuits 110 and 111, these circuits 110 and 111 have a capability of determining whether or not the calculation to determine the component of 2 should be carried out, in reference to the signals S31 and S21 supplied from the control signal generator 107.

After the R, G and B signals have been converted into the color components $\alpha$, $\beta$ and $\gamma$ in this way, these are converted by ROMs 113, 114 and 115 into the partial color conversion data which are then applied to the synthesizer 116 for the synthesis thereby to provide the printing data Y, M and C at the output terminal 12.

Figure 10:
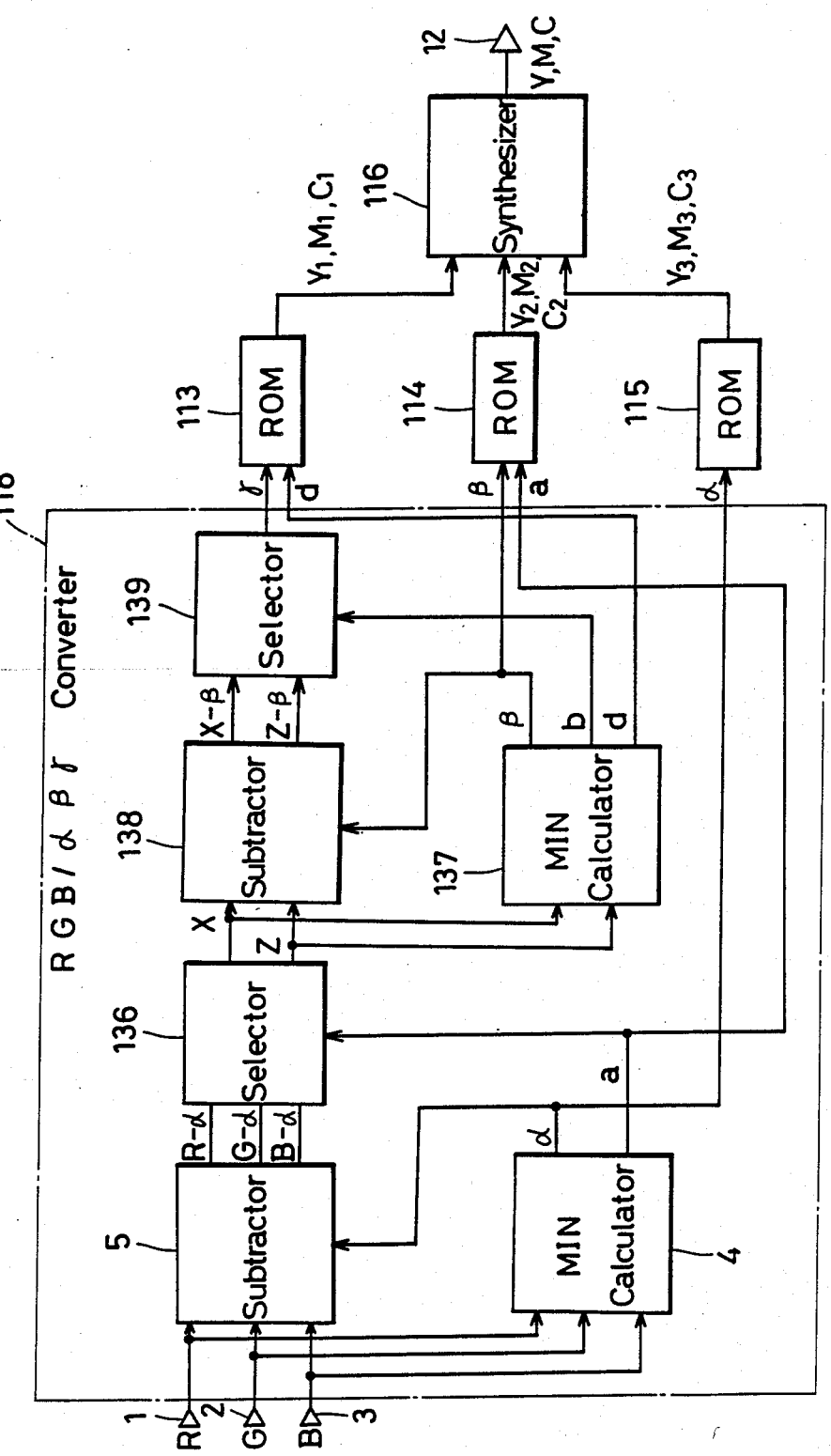
FIGS. 10 to 12 are circuit block diagrams showing respective variants of the color converting device of FIG. 8.

The RGB/$\alpha$ $\beta$ $\gamma$ converter 118 of the above described construction may be modified as shown in FIG. 10, reference to which will now be made.

In FIG. 10, reference numeral 4 represents the minimum value calculator for calculating the respective minimum values of the R, G and B signals; reference numeral 5 represents the subtractor for subtracting the achromatic color components from the respective R, G and B signals; reference numeral 136 represents a selector for two of the (R$-\alpha$), (G$-\alpha$) and (B$-\alpha$) signals from which the minimum value has been excluded; reference numeral 137 represents a minimum calculator for calculating the value $\beta$ of one of signals X and Z which is the smallest of all; reference numeral 138 represents a subtractor for subtracting $\beta$ from each of the signals X and Z; and reference numeral 139 represents a selector for extracting the greatest value of signals (X$-\beta$) and (Z$=\beta$) for outputting it as the second chromatic color component, the other circuit components shown in FIG. 10 being identical with those shown in FIG. 8.

The circuit shown in FIG. 10 operates in the following manner.

Assuming that the R, G and B signals have been applied to the input terminals 1, 2 and 3, these input signals are supplied to the minimum value calculator 4 and also to the subtractor 5. The subtractor 4 upon the receipt of the input signals operates to perform a calculation of $\alpha = $MIN(R, G, B) and then to synthesize and output a code a indicative of which one of the R, G and B signals is of the minimum value. On the other hand, the subtractor 5 upon the receipt of the input signals operates to subtract $\alpha$ from each of the R, G and B signals and then to output the differences (R$-\alpha$), (G$-\alpha$) and (B$-\alpha$). The minimum value of these differences is zero. The selector 136 operates to exclude one of the differences which becomes zero and then to output the remaining two of these differences as the outputs X and Z. By way of example, as shown in FIG. 9, assuming that each of the R, G and B signals is expressed in 6 bits in 0 to 63 gradations, if R$=60$, G$=25$ and B$=10$, the B signal takes the smallest value and, therefore, $\alpha = $B$=10$ and, hence, (R$-\alpha$)$=50$, (G$-\alpha$)$=15$ and (B$-\alpha$)$=0$. At this time, X$=$(R$-\alpha$)$=50$, Z$=$(G$-\alpha$)$=15$. Also, a takes a value shown by B. Similarly, if the R signal takes the smallest value, X$=$(G$-\alpha$), Z$=$(B$-\alpha$); and if the G signal takes the smallest value, X$=$(R$-\alpha$) and Z$=$(B$-\alpha$). Then, the minimum value calculator 137 calculates the minimum value of the data X and Z as $\beta = $MIN(X,Z) and subsequently outputs a signal b indicative of which one of the R, G and B signal $\beta$ stands for and a signal d indicative of one of the signals X and Z, which is not represented by the signal b, stands for. By way of example, as shown in FIG. 9, assuming that X$=$(R$-\alpha$)$=50$ and Z$=$(G$-\alpha$)$=15$, then, $\beta = $MIN(X,Z)$=15$ and the signals b and d will represent the G and R signals, respectively. In other words, $\beta = $MID(R,G,B)$-\alpha$. The subtractor 138 subtracts $\beta$ from the signals X and Z to determine the differences (X$-\beta$) and (Z$-\beta$). Subsequently, since of the differences (X$-\beta$) and (Z$-\beta$) what includes the signal which is represented by the signal b is zero, the selector 139 outputs as a signal $\gamma$ the signal which is not zero. In the example of FIG. 9, (X$-\beta$)$=$(R$=\alpha-\beta$)$=35$ and (Z$-\beta$)$=$(G$-\alpha-\beta$)$=0$ and, since the G signal is represented by the signal b, $\gamma = 35$. In other words, $\gamma = $[MAX(R,G,B)$-\alpha-\beta$)]$=-$[MAX(R,G,B)$-\alpha-$MID(R,G,B)$+\alpha$)]$=-$[MAX(R,G,B)$-$MID(R,G,B)].

The achromatic color component $\alpha$, the first chromatic color component $\beta$ and the second chromatic color components $\gamma$ are converted into the partial color conversion data by respective ROMs 115, 114 and 113 and, then, synthesized by the synthesizer 116 for outputting the printing data to the output terminal 12 in a manner substantially similar to that described hereinbefore.

Figure 11:
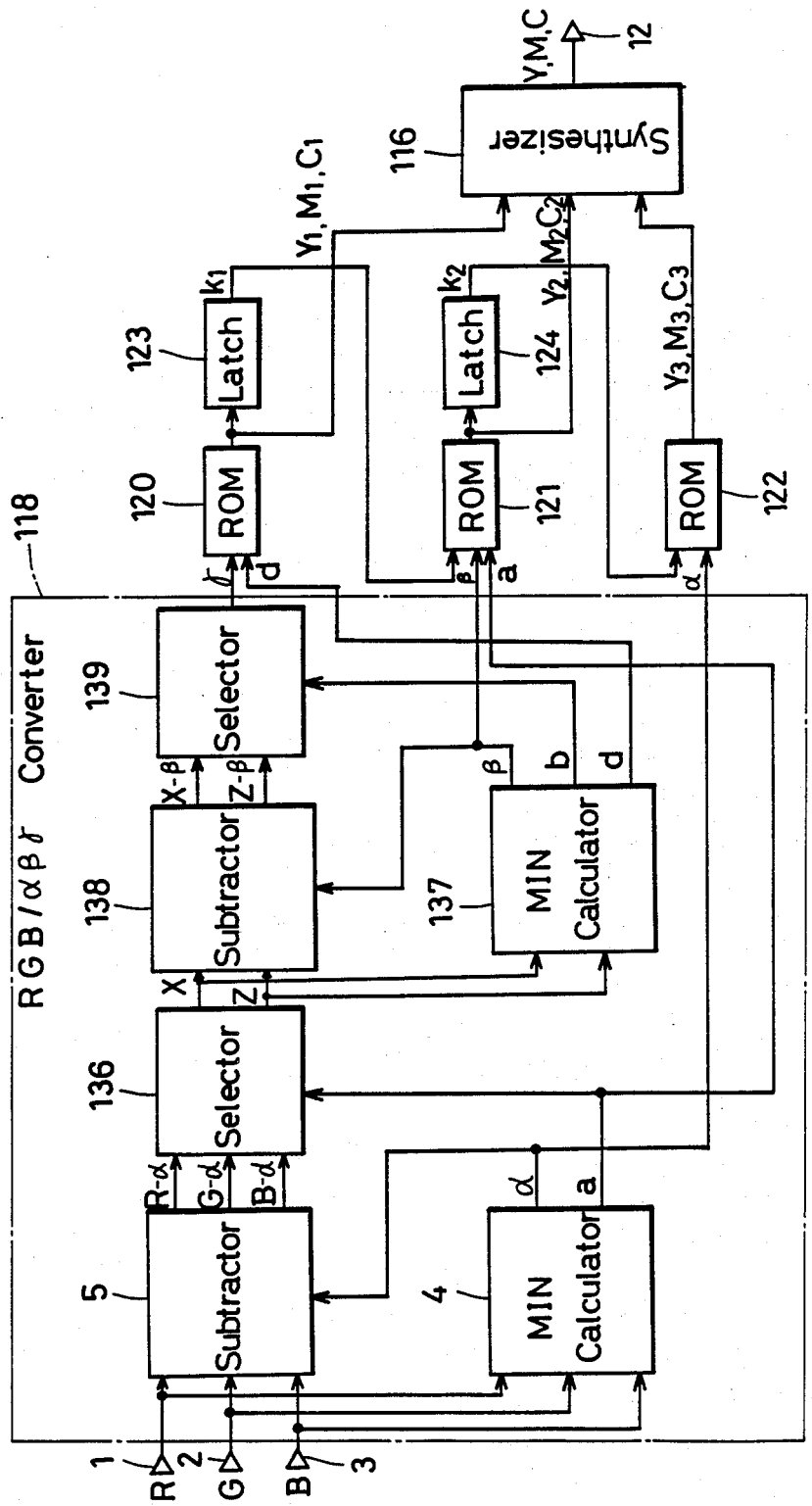

Another variant of the third preferred embodiment of the present invention shown in FIG. 8 is illustrated in FIG. 11. In this figure, reference numerals 120, 121 and 122 represent respective ROMs for table conversion, and reference numerals 123 and 124 represent respective latch circuits for temporary data storage. Other circuit blocks shown therein are identical with those shown in FIG. 10.

The color picture reproduced by a color printer is represented by three colors, yellow, magenta and cyan, however, it often occurs that the color of the printed picture tends to delicately vary because of the characteristic of the printing ink which is difficult to stick when a background transfer is effected or when ink is repeatedly over-printed on the same position. Accordingly, while in the embodiments of FIGS. 8 and 10 the color components $\alpha$, $\beta$ and $\gamma$ have been described and shown as color-converted separately, the color components $\alpha$, $\beta$ and $\gamma$ must be considered associated with each other in order to achieve an accurate color reproduction. Therefore, according to the variant shown in FIG. 11, design has been made that ROM 120 used therein can output, in addition to the signals Y1, M1 ad C1 obtained by converting the second chromatic color component $\gamma$, a signal k1 necessary to cause the conversion value of first chromatic color component $\beta$ to change according to the value of the achromatic color component $\gamma$ and, on the other hand, ROM 121 can output, in addition to the signals Y2, M2 and C2, a signal k2 necessary to cause the conversion value of the achromatic color component $\alpha$ to change according to the value of the first chromatic color component $\beta$.

The circuit shown in FIG. 11 operates in the following manner.

The second chromatic color component $\gamma$ is applied to ROM 120 to read out the value of the signal k1, corresponding to the value of the inputted chromatic color component $\gamma$, which signal k1 is in turn stored in the latch circuit 123 and is then inputted to ROM 121. ROM 121 stores a plurality of, for example, 16, conversion tables necessary to convert the first chromatic color component $\beta$ into Y2, M2, C2 and k2 and makes use of one of the conversion tables, which has been designated by the signal k1, for converting the first chromatic color component $\beta$. Simultaneously therewith, the value of the signal k2 is read out from ROM 121, is then stored in the latch circuit 124, and finally supplied to ROM 122. ROM 122 stores a plurality of, for example, 16, conversion tables necessary to convert the achromatic color component $\alpha$ into Y3, M3 and C3 and makes use of one of the conversion tables, which has been designated by the signal k2, for converting the achromatic color component $\alpha$. The synthesizer 116 performs calcula-tions of Y=Y1+Y2+Y3, M=M1+M2+M3 and C=C1+C2+C3 as is the case with the embodiment of FIG. 8 to provide the printing data Y, M and C to the output terminal 12. At this time, Y2, M2 and C2 are converted into different values in dependence on the value of the second chromatic color component $\gamma$ and Y3, M3 and C3 are converted into different values in dependence on the components $\gamma$ and $\beta$. In other words, it is possible to output the conversion data wherein the color components $\alpha$, $\beta$ and $\gamma$ are associated with each other.

For the conversion table for the second chromatic color component $\gamma$, 768 bytes($=64\times 4(Y1,M1,C1,k1)\times 3(d=R,G,B)$) is required if each of the R, G and B data is 6 bit signal having 0 to 63 gradations. For the conversion table for the first chromatic color component $\beta$, 12,288 bytes($=64\times 4(Y2,M2,C2,k2)\times 3(a=R,B,B)\times 16(k1)$) is required if the signal k1 is 4 bit signal having 16 instructions, and for the conversion table for the achromatic color component $\alpha$, 3,072 bytes($=64\times 3(Y3,M3,C3)\times 16(k2)$) is required if the signal k2 is 4 bit signal hving 16 instructions. Thus, the total required memory capacity according to the embodiment shown in and described with reference to FIG. 11 is 16,128 bytes.

Figure 12:
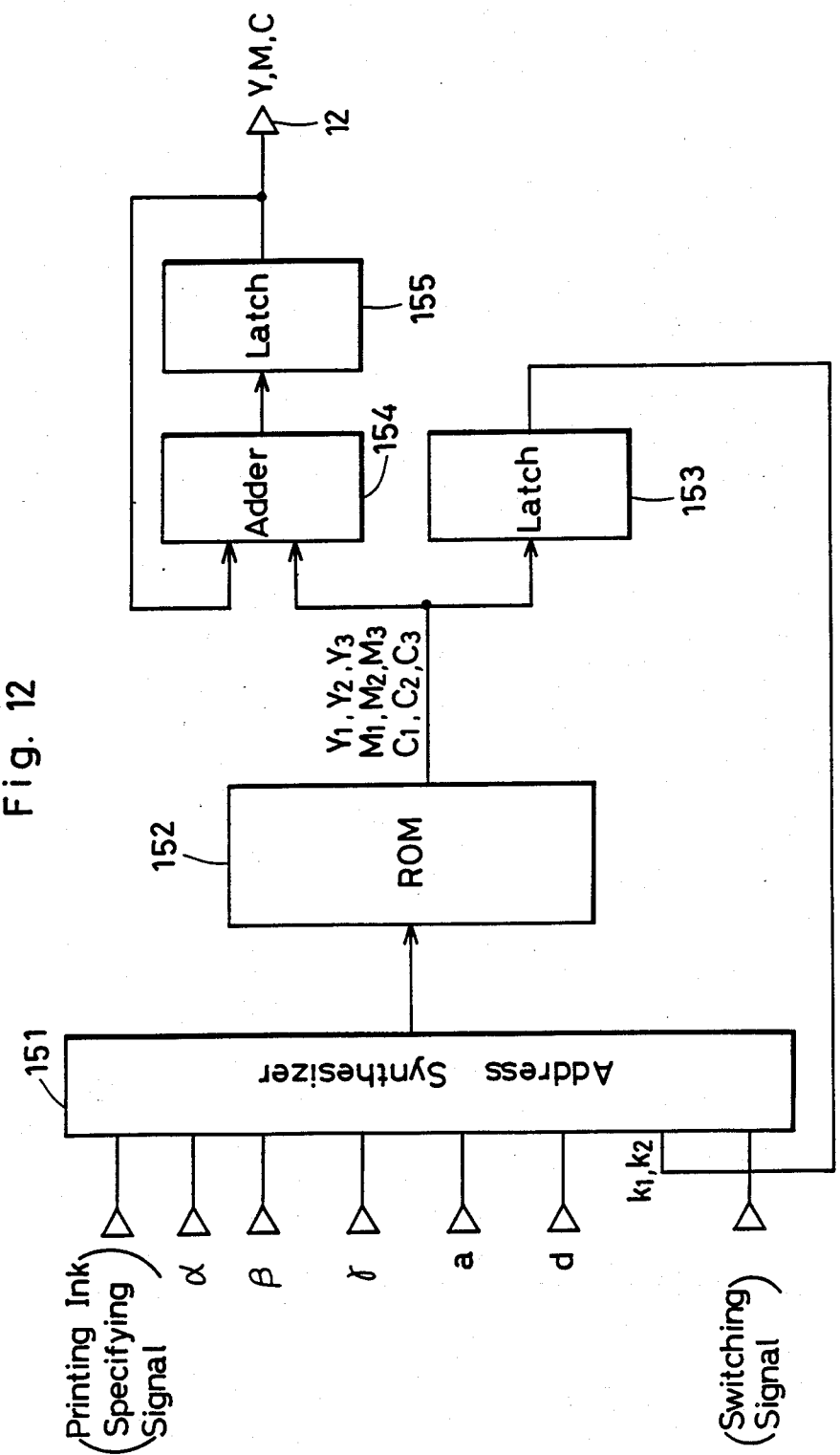

A further variant of the embodiment of FIG. 8 is shown in FIG. 12, in which a single ROM 152 is used for carrying out the partial color conversion after the separation by the RGB/$\alpha \beta \gamma$ converter 118 into the color components $\alpha$, $\beta$ and $\gamma$. For this purpose, only a table conversion section of the single ROM is schematically illustrated in FIG. 12 in circuit block diagram.

In FIG. 12, reference numeral 151 represents an address synthesizer for synthesizing addresses of ROM; reference numeral 152 represents ROM for the table conversion; reference numeral 153 represents a latch circuit for the temporary storage of correction signals k1 and k2; and reference numeral 154 represents an adder for summing the color conversion data of the color components $\alpha$, $\beta$ and $\gamma$; and reference numeral 155 represents a latch circuit for the temporary storage of the color conversion data which have been added together.

Figure 13:
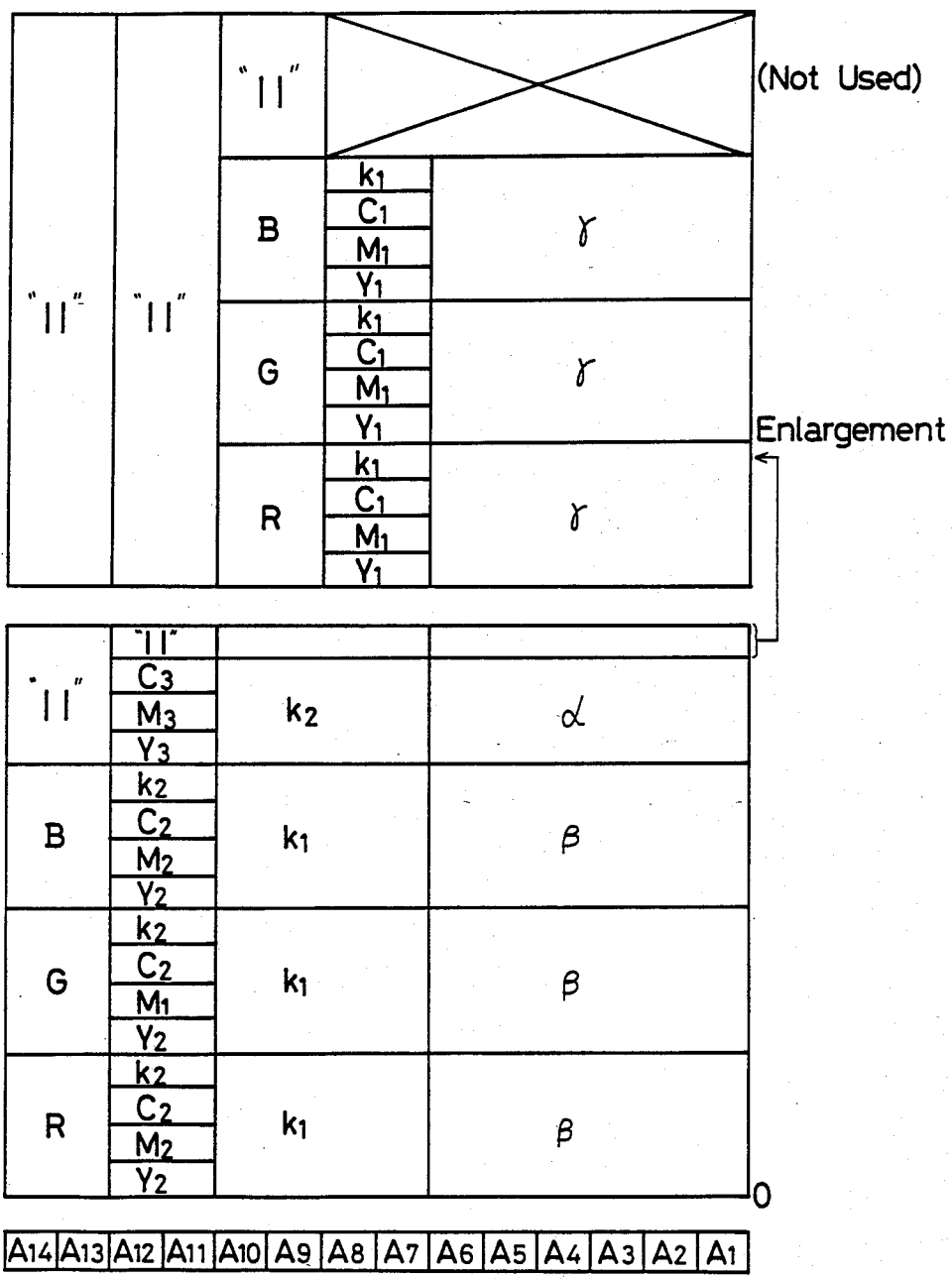
FIG. 13 is a diagram showing an example of the contents stored in a read-only memory used in the color converting device shown in FIG. 12.

One example of an address map stored in ROM 152 is illustrated in FIG. 13. In this instance, let is be assumed that each of the color components $\alpha$, $\beta$ and $\gamma$ is composed of 6 bits, each of the correction signals k1 and k2 is composed of 4 bits, each of the signals a and d which represent the color of minimum value and the color of maximum value, respectively, is composed of 2 bits (for example, R is expressed by "00", G is expressed by "01" and B is expressed by "10"), and each of ink color specifying signals is composed of 2 bits (for example, the yellow ink specifying signal is expressed by "00", the magenta ink specifying signal is expressed by "01" and the cyan ink specifying signal is expressed by "10").

At the outset, the second chromatic color component $\gamma$ is converted. The address synthesizer 151 operates to synthesize the second chromatic color component $\gamma$, the value d representative of the color of maximum value and the ink color specifying signal, for example, the yellow ink specifying signal to provide the address signal indicative of a table conversion section for converting the second chromatic color component $\gamma$ shown in FIG. 13 into Y1, which address signals is table-converted by ROM 152 into Y1 which is in turn summed by the adder 154 together with a signal latched in the latch circuit 155. The latch circuit 155 is at this time so adjusted by a CLEAR signal that "0" may be stored therein, thereby enabling Y1 to be latched in the latch circuit 155 as Y1+0=Y1. Similarly, the data k1 is determined by the table conversion of the value of the second chromatic color component $\gamma$, which data is then latched in the latch circuit 153. Then, the first chromatic color component $\beta$ is converted. The first chromatic color component $\beta$, the signal a designating which one of the colors is designated by the minimum value, the data k1 latched in the latch circuit 153, and the ink color specifying signal are synthesized by the address synthesizer 151, followed by the reading of Y2 from ROM 152 for the subsequent summation by the adder 154 with the color conversiion data Y1 latched in the latch circuit 155, the resultant Y1+Y2 being latched again in the latch circuit 155. Similarly, the data k2 is read out and latched again in the latch circuit 153.

Similarly, the achromatic color component α is converted. Then, the achromatic color component α, the signal k2 latched in the latch circuit 153 and the ink color specifying signal are synthesized in the address synthesizer 151, followed by the reading of Y3 from ROM 152 for the subsequent summation by the adder 154 with the color conversion data Y1+Y2 latched in the latch circuit 155, the resultant Y1+Y2+Y3=Y being latched again in the latch circuit 155 and provided to the output terminal 12.

The memory capacity of ROM used in the embodiment of FIG. 12 is 16,128 bytes as is the case with that in the embodiment of FIG. 11, however, it will be in practice 129,024 bits. Thus, since 1 byte corresponds to 8 bits, ROM of a memory capacity of 128 kilobits can be advantageously used in the practice of the embodiment of FIG. 12.

It is to be noted that those skilled in the art can conceive the design of the RGB/α β γ converter 118 other than that shown in and described with reference to any one of FIGS. 10 to 12. It is also to be noted that, where the R, B and B signals are desired to be converted into the four color printing data for instructing the printer to print in one or a mixture of yellow (Y), magenta (M), cyan (C) and black (K) colors, it can be accomplished by converting the achromatic color component α into the printing data for the printing in black color and to convert the first and second chromatic color components β and γ into the printing data for the printing in one or a mixture of yellow, magenta and cyan colors.

The concept of the present invention can also be applicable even where each of the R, G and B signals are composed of 7 or 8 bits other than 6 bits to which reference has been made.

As hereinbefore described, according to the third preferred embodiment of the present invention shown in FIGS. 8 to 13 including its variants, since the R, G and B signals are separated into the achromatic color component α the first chromatic color component β and the second chromatic color component γ which are subsequently independently converted partially and then synthesized to provide the printing data, any possible difference in color can be minimized and a fine adjustment of, for example, memory colors is possible at high fidelity.

Figure 14:
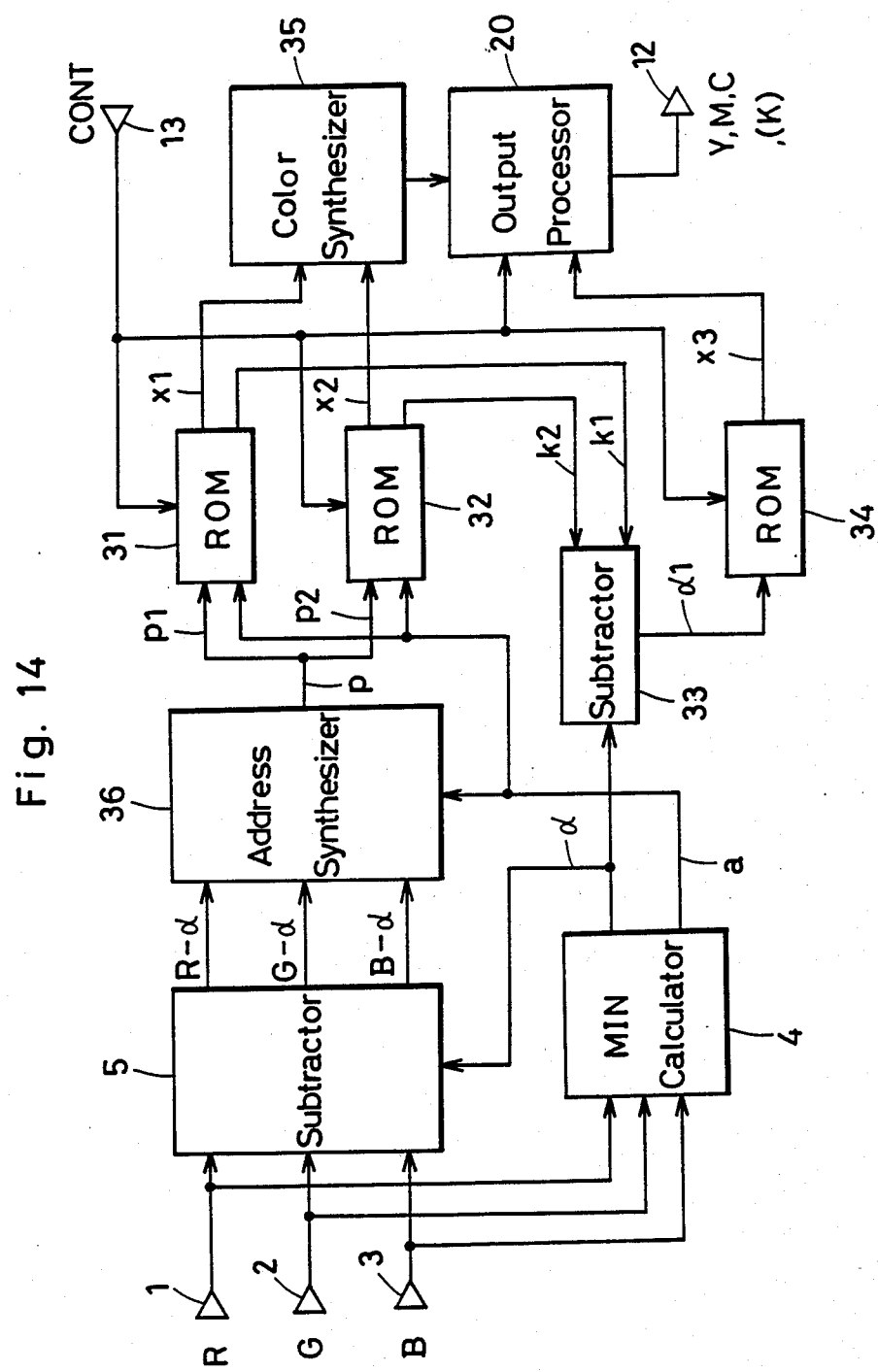
FIG. 14 is a circuit block diagram showing the color converting device according to a fourth preferred embodiment of the present invention.

A fourth preferred embodiment of the present invention is illustrated in FIG. 14. The color converting device according to this embodiment is so constructed that the color components are subjected to a bit plane division prior to being converted into the color conversion data.

Referring to FIG. 14, reference numerals 31 and 32 represents first and second ROMs for the storage of the partial color conversion data of the color components, respectively; reference numeral 33 represents a subtractor for adjusting the achromatic color component α; reference numeral 34 represents a third ROM for the storage of the partial color conversion data of the achromatic color component α; and reference numeral 35 represents a color synthesizer for synthesizing and summing the partial color conversion data stored in the first and second ROMs 31 and 32. Other components than those listed above are identical with those shown in and described with reference to FIG. 6.

The color converting device of the construction shown in FIG. 14 operates in the following manner.

When the R, G and B signals are applied to the minimum value calculator 4 and also to the subtractor 5, the minimum value calculator 4 outputs the minimum value α and the identifying signal a and the subtractor 5 outputs respective results of calculation of $(R-\alpha)$, $(G-\alpha)$ and $(B-\alpha)$ one of which is zero. Receiving the identifying signal a, the address synthesizer 36 operates to determine the results of calculation and then to provide the two results of calculation P which are not zero.

In other words, the output signal P represent $(R-\alpha)$ and $(G-\alpha)$ when α=B; $(R-\alpha)$ and $(B-\alpha)$ when α=G; or $(G-\alpha)$ and $(B-\alpha)$ when α=R. All of these signals are composed of 6 bits.

In this instance, $(R-\alpha)$, $(G-\alpha)$ and $(B-\alpha)$ are expressed as follows.

$(R-\alpha)$: $(r5, r4, r3, r2, r1, r0)$ $(G-\alpha)$: $(g5, g4, g3, g2, g1, g0)$ $(B-\alpha)$: $(b5, b4, b3, b2, b1, b0)$ Then, the output signal P is divided into two signals P1 and P2 which are supplied to respective address terminals of the first and second ROMs 31 and 32. At this time, the signal P1 is assumed to be $(r5, r4, r3, g5, g4, g3)$ when α=B, $(r5, r4, r3, b5, b4, b3)$ when α=G, or $(g5, g4, g3, b5, b4, b3)$ when α=R. On the other hand, the signal P2 is assumed to be $(r2, r1, r0, g2, g1, g0)$ when α=B, $(r2, r1, r0, b2, b1, b0)$ when α=G, or $(g2, g1, g0, b2, b1, b0)$ when α=R. The division into these two signals P1 and P2 is such as to cause the bits of the same significant places to be included in one and the same address aggregation and is generally referred to as a bit plane division.

Each of the first and second ROMs 31 and 32 is required to have a bank replacing capability in three ways, that is α=R, α=G and α=B, and this bank replacement can be accomplished according to the identifying signal a. The first and second ROMs 31 and 32 store a partial conversion data x1 composed of y1, m1 and c1, a partial conversion data x2 composed of y2, m2 and c2 and partial conversion data k1 and k2 of the achromatic color component generated by a combination of x1 and x2.

Figure 15:
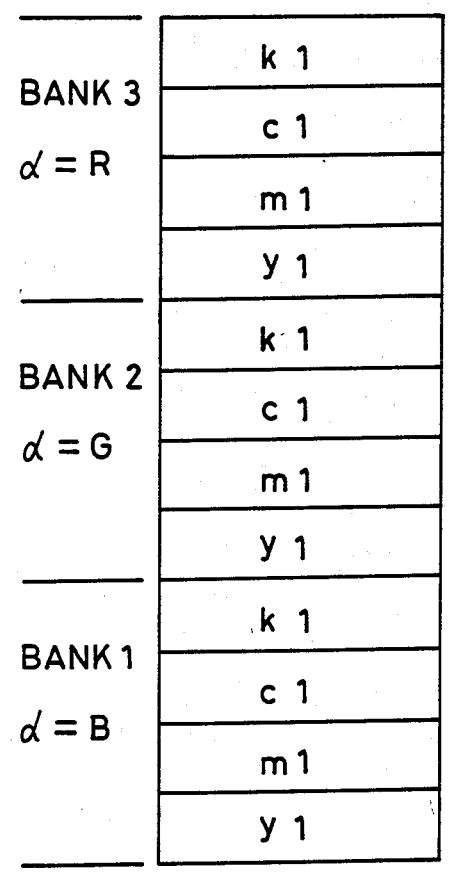
FIG. 15 is a diagram showing an example of the contents stored in the read-only memory used in the color converting device of FIG. 14.

The relationship of the bank structure of the first ROM 31, the printing data and the address locations of y1, m1, c1 and k1 is illustrated in FIG. 15, it being to be noted that the second ROM 32 is equally so constructed as to resemble the structure shown in FIG. 15.

When the signals P1 and P2 and the identifying signal a are applied to the address terminals of the first and second ROMs 31 and 32 and the color specifying signals for specifying the printing ink of yellow, magenta and cyan colors are applied from the input terminal 13 to the first and second ROMs 31 and 32, the data k1 and k2 and the partial color conversion data x1 and x2 corresponding to the address signal P1 and P2 can be obtained. The memory capacity required of each of the first and second ROMs 31 and 32 is 6.144 kilobits(=$2^6$(the number of addresses)×3(the number of banks)×4(data)×8(bit)).

The partial conversion data x1 and x2 so obtained are supplied to the color synthesizer 35 which in turn performs calculation of $(y1+y2)$, $(m1+m2)$ and $(c1+c2)$. On the other hand, the data k1 and k2 are inputted to the subtractor 33 which in turn performs calculation of $\alpha 1 = \alpha - k1 - k2$, a signal representative of α 1 being subsequently supplied to the address terminal of ROM 34. ROM 34 stores the partial color conversion data of y3, m3 and c3 for the conversion of the achromatic color component α 1 and performs a table conversion to determine by means of the table conversion the partial color conversion data x3 corresponding to the address signal α 1, it being, however, to be noted that the color specifying signal is also inputted thereto from the input terminal 13.

The output processor 20 performs an addition of the output data of the color synthesizer 35 and the partial conversion data of ROM 34 together to provide respective results of calculation of Y=y1+y2+y3, M=m1+m2+m3 and C=c1+c2+c3.

In the illustrated embodiment of FIG. 14, the total memory capacity required is 13.824 kilobits (=6.144 kilobits×2+$2^6$×3 (numbers of colors)×8 (bit)). This total memory capacity is about 1/28 of the total memory capacity (about 394 kilobits) required in the embodiment shown in and described with reference to FIG. 6 and, therefore, the required total memory capacity is reduced.

Figure 16:
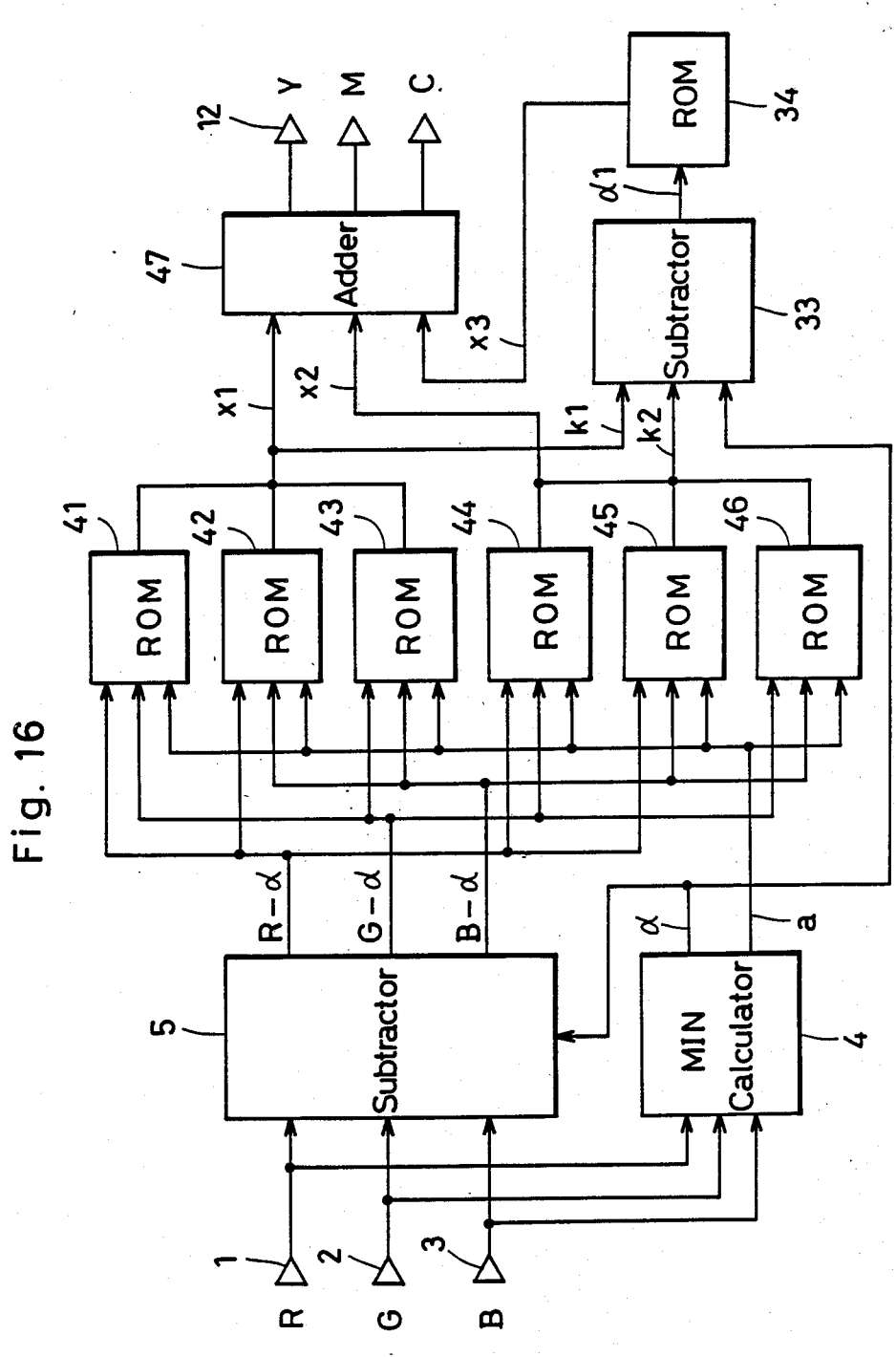
FIG. 16 is a circuit block diagram showing a variant of the color converting device of FIG. 15.

The color converting device shown in and described with reference to FIG. 16 may be modified as shown in FIG. 16. Referring now to FIG. 16, reference numerals 41 to 46 represent respective ROMs operable to provide six data as address signals, said six data comprising a plurality of combinations of color component data (R−α), (G−α) and (B−α), each combination including two of those color component data, each combination of the color component data being further divided into an upper significant bit group and a lower significant bit group. These ROMs 41 to 46 store, for each address location, the partial color conversion data of y1, m1, c1 and k1 or y2, m2, c2 and k2.

Reference numeral 47 represents an adder for summing the partial color conversion data x1 (y1, m1, c1), the partial color conversion data x2 (y2, m2, c2) and the partial color conversion data x3 (y3, m3, c3) together. Other circuit components than those listed above are identical with those shown in and described with reference to FIG. 14.

The color converting device of the construction shown in FIG. 16 operates in the following manner.

Assuming that the R, G and B signals have been applied to both of the minimum value calculator 4 and the subtractor 5, the subtractor 5 provides the three data (R−α), (G−α) and (B−α) representative of the respective color components and the minimum value calculator 4 provides the achromatic color component data α and the identifying signal a. ROM 41 is adapted to receive from the subtractor 5 higher three bits of each of the color data (R−α) and (G−α); ROM 42 is adapted to receive from the subtractor 5 higher three bits of each of the color data (R−α) and (B−α); and ROM 43 is adapted to receive from the subtractor 5 higher three bits of each of the color data (G−α) and (B−α). On the other hand, ROM 44 is adapted to receive from the subtractor 5 lower three bits of each of the color data (R−α) and (G−α); ROM 45 is adapted to receive from the subtractor 5 lower three bits of each of the color data (R−α) and (B−α); and ROM 46 is adapted to receive from the subtractor 5 lower three bits of each of the color data (G−α) and (B−α).

The identifying signal a generated from the minimum value calculator 4 is applied to chip enable terminals of all of ROMs 41 to 46. This identifying signal a is used to cause ROMs 41 and 44 to be activated when α=B, to cause ROMs 42 and 45 to be activated when α=G, and to cause ROMs 43 and 46 to be activated when α=R.

With this way of addressing and also with the control by the signal applied to the chip enable terminals, the partial color conversion data x1 (y1, m1, c1), the color conversion data k1 of the achromatic color component extraneously generated upon this color conversion, the partial color conversion data x2 (y2, m2, c2), and the color conversion data k2 of the achromatic color component extraneously generated upon this color conversion can be determined according to the table conversion in ROMs.

The subtractor 33 is operable to carry out a subtraction of α 1=α−k1−k2, wherein α 1≧0. The result of this subtraction, that is, α 1, is supplied to an address terminal of ROM 34 to determine the partial color conversion data x3 (y3, m3, c3) corresponding to the address location according to the table conversion, which is then summed by the adder 47 together with the partial color conversion data x1, x2 and x3 thereby to provide the printing data Y, M and C.

Each of ROMs 41 to 43 and 45 and 46 employed in the embodiment shown in and described with reference to FIG. 16 is required to have a memory capacity of 2,048 bits(=$2^6$(the number of addresses)×4(the number of data)×8(the number of bits per data) while ROM 44 is required to have a memory capacity of 1,536 bits(=$2^6$(the number of addresses)×3(the number of data)×8(the number of bits per data)). Thus, it will readily be seen that the total memory capacity required in the practice of the embodiment of FIG. 16 is 13.824 kilobits. This total memory capacity required corresponds substantially to about 1/28 of that required in the embodiment of FIG. 6.

As hereinbefore described, a series of experiments have revealed that, even if one bit out of the number of bits of the chromatic color component is reduced relative to the number of bits of the achromatic color component, the quality of the eventually printed picture would not be noticeably reduced. In view of this, if the number of bits of each of the data (R−α), (G−α) and (B−α) may be reduced to 5 bits, for example, divided into higher three bit unit and lower two bit unit for the color conversion. The ROM memory capacity required in this case may be 9.216 bit, thereby achieving the ratio of compression of about 42.

In describing the embodiment of FIG. 16, reference has been made to each of the R, G and B signals composed of 6 bits. However, it may be composed of 7 bits or 8 bits. In such case, it is also possible for the number of bits of each of the chromatic color components may be reduced to 6 while that of the achromatic color component is kept to 7 or 8 bits, thereby to accomplish both the compression of the ROM memory capacity and the high quality printing resulting from the increased gradation.

It is also to be noted that the means for separating each of the R, G and B signals into the achromatic color component and the chromatic color components which has been shown in and described with reference to FIG. 7 may be employed in the circuit of FIG. 16.

According to the fourth embodiment of the present invention, since the separated color components are subjected to the bit plane division to provide the respective partial color conversion data, the color conversion for each picture element is possible at a high color reproducibility. Moreover, the required total memory capacity can be advantageously reduced.

Figure 17:
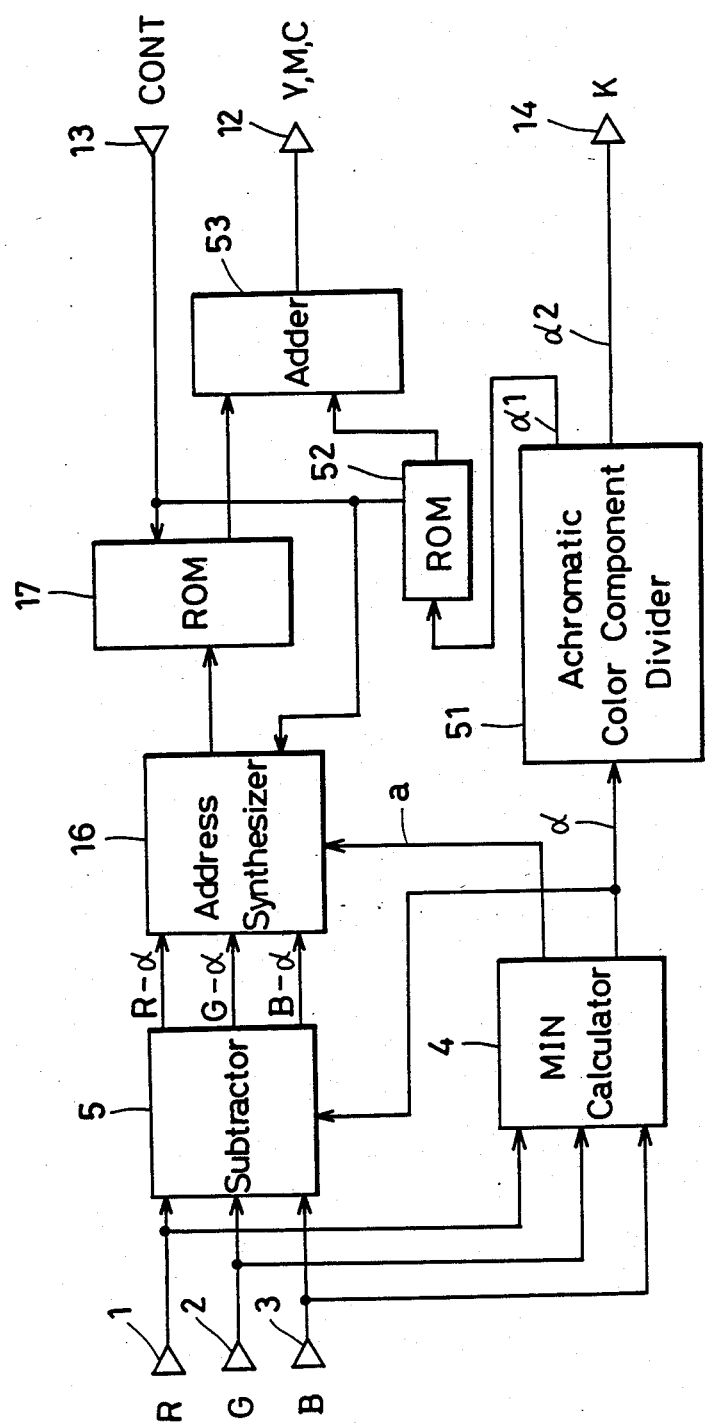
FIG. 17 is a circuit block diagram showing the color converting device according to a fifth preferred embodiment of the present invention.

FIG. 17 illustrates a circuit block diagram of a fifth preferred embodiment of the present invention. In FIG.

Figure 18:
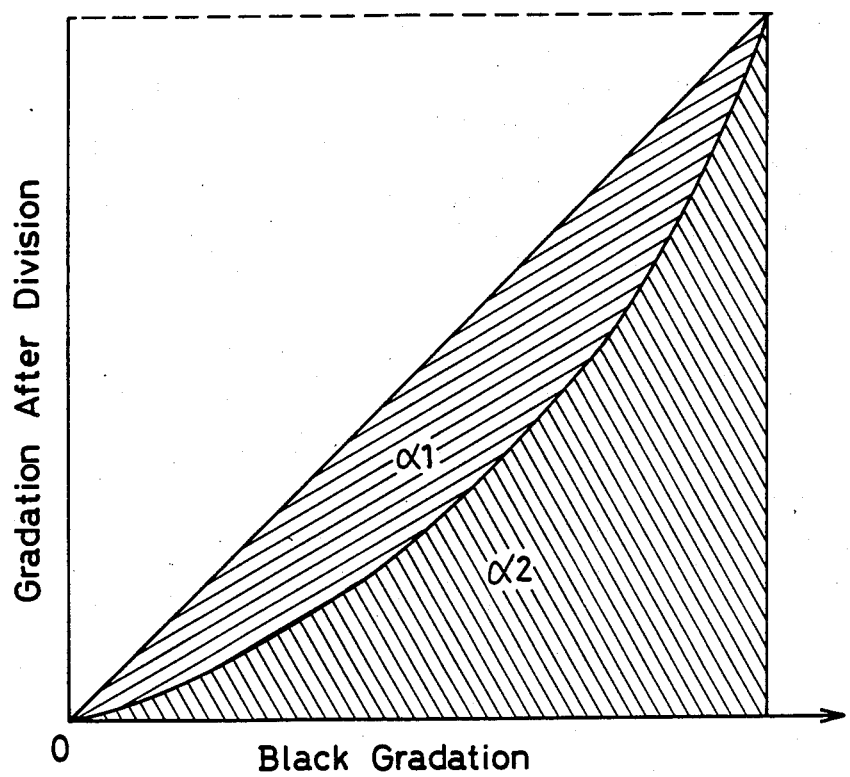
FIG. 18 is a diagram showing an example of the rate of division of the achromatic color component in the color converting device of FIG. 17.

17, reference numeral 51 represents an achromatic color component divider for dividing the achromatic color component $\alpha$ into first and second achromatic color components $\alpha 1$ and $\alpha 2$ at, for example, such a rate and in such a gradation as shown FIG. 18. Reference numeral 52 represents ROM for converting the first achromatic color component $\alpha 1$ into second color conversion data Y2, M2 and C2, and reference numeral 53 represents an adder for summing the first color conversion data Y1, M1 and C1, converted by ROM 17, together with the second color conversion data Y2, M2 and C2 converted by ROM 52, thereby to provide the printing data Y, MM and C to the output terminal 12.

The second achromatic color component $\alpha 2$ is provided direct to an output terminal 14 as the printing data K. Other circuit components than those referred to above are identical with those shown in FIG. 6.

The color converting device of the construction shown in FIG. 17 may be modified in numerous ways, some of which will now be described with reference to any one of FIGS. 19 to 22.

Figure 19:
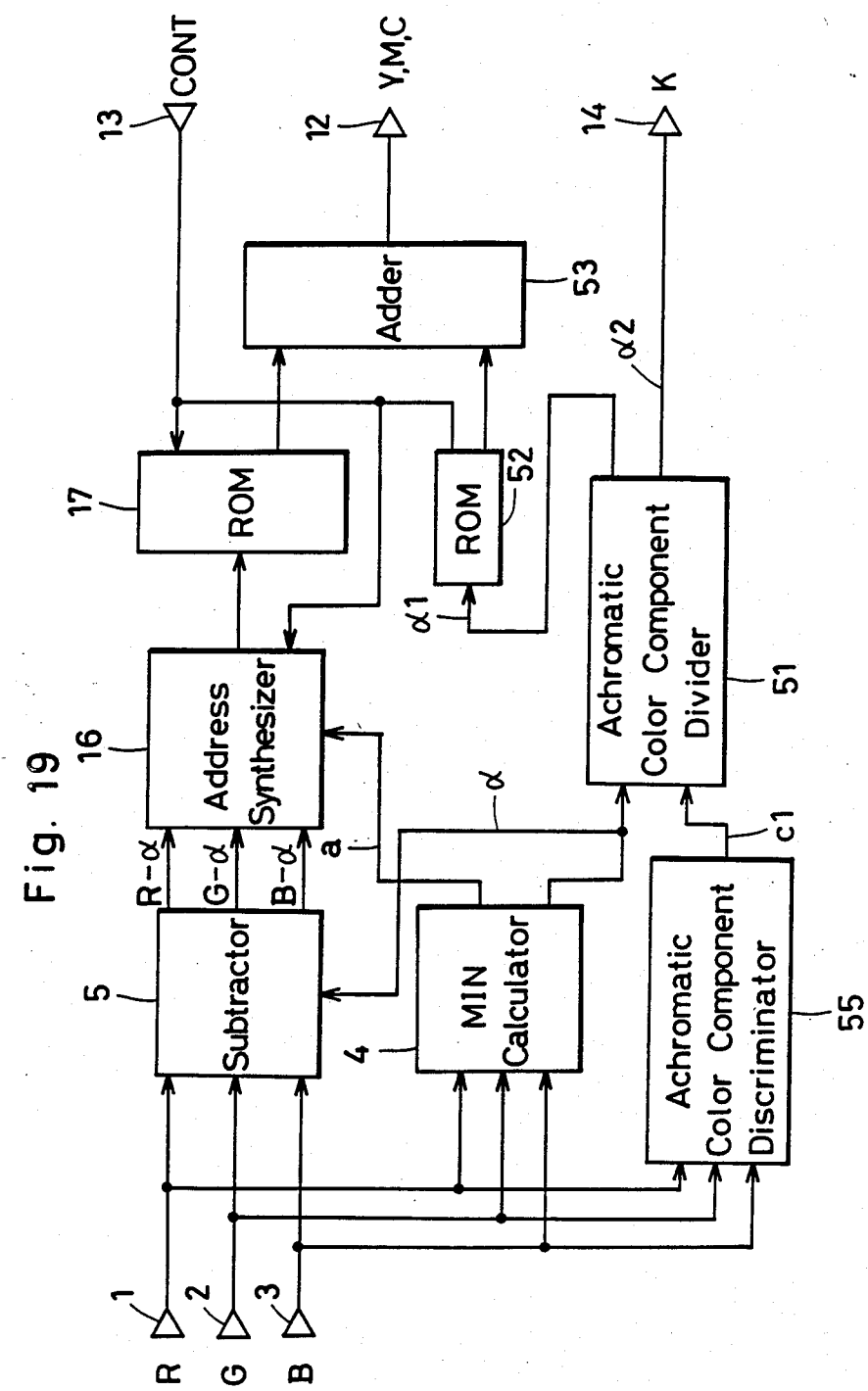
FIGS. 19 to 22 are circuit block diagrams showing respective variants of the color converting device of FIG. 17.

In a variant shown in FIG. 19, reference numeral 55 represents an achromatic color component discriminator so designed as to generate a discriminated signal C1 which may be in a high logic level when the R, G and B signals are such as to be $R=G=B$, and in a low logic level when the R, G and B signals differ from each other. The achromatic color component divider 51 is operable in response to the discriminated signal C1 to determine whether or not the division of the achromatic color component $\alpha$ is required. The reason for the necessity of the division of the achromatic color component in the achromatic color divider 51 is because it has been found that any one of the printing inks of other colors than black is not easy to be overprinted on the black ink deposit, and, since only the achromatic color component emerges when $R=G=B$, the overprinting of the other color printing inks need not be taken into consideration. Accordingly, when the discriminated signal C1 is in the high logic level, the achromatic color component $\alpha 1$ is zero, but when the discriminated signal C1 is in the low logic level, switching is performed to the dividing operation.

Figure 20:
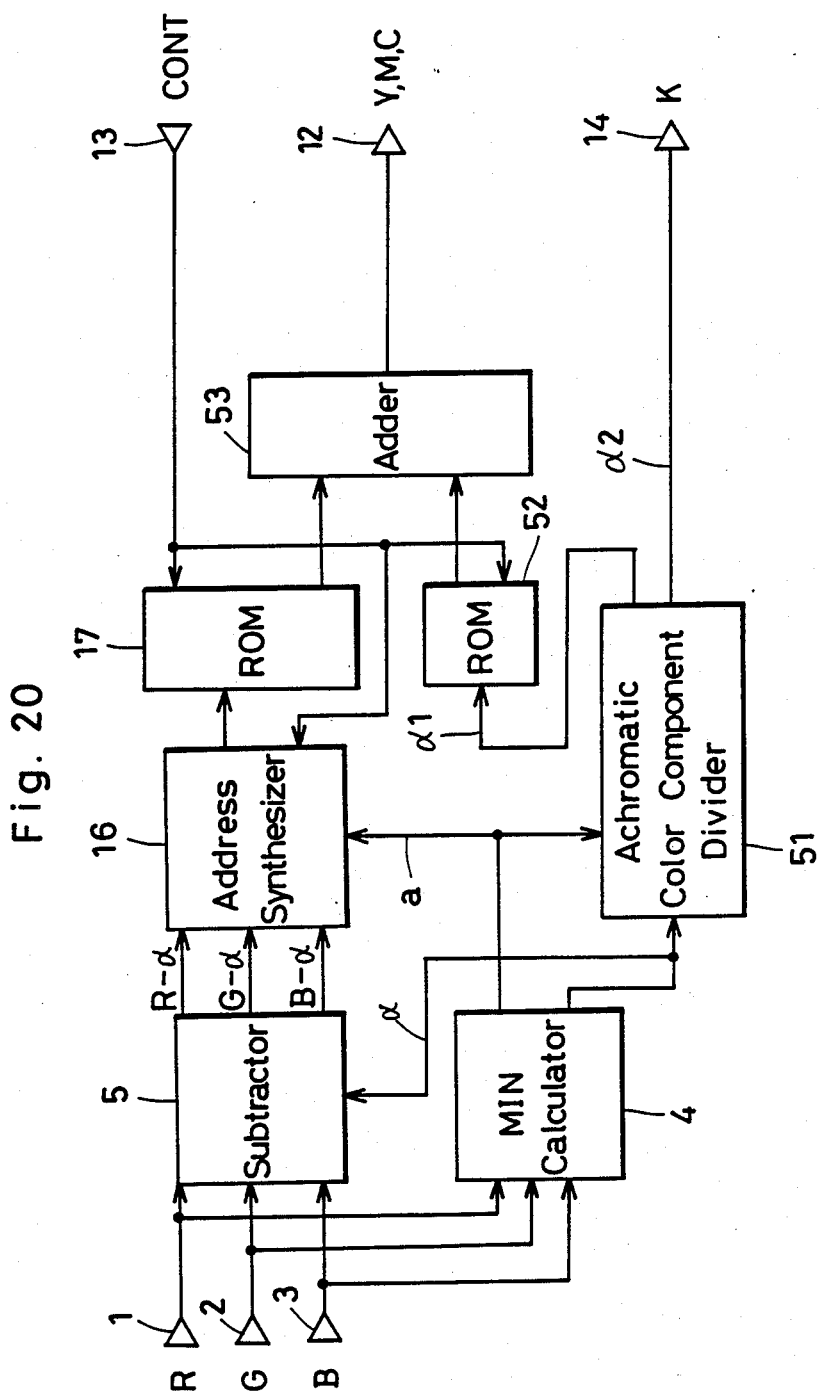

The color converting device according to another variant of the embodiment of FIG. 17 is shown in FIG. 20. In this variant, the achromatic color component divider 51 is so designed as to divide the achromatic color component $\alpha$ according the identifying signal a generated from the minimum value calculator 4.

Since the printing ink is not always of pure color and the printing characteristic varies from one printing ink to another, one printing ink will not always have an affinity with the other printing ink. By way of example, it often occurs that, when the yellow and magenta printing inks of the equal quantity are applied on a black color ink deposit of similar gradation, the both will not always exhibit the affinity with the black color ink deposit depending on the properties thereof. Accordingly, the division of the achromatic color component into the first and second achromatic color components $\alpha 1$ and $\alpha 2$ with the achromatic color component divider ensures a high quality, beautiful printing.

For this purpose, the achromatic color component divider 51 shown in FIG. 20 is capable of varying the proportion of division into the first and second achromatic color components $\alpha 1$ and $\alpha 2$ in response to the identifying signal a, indicative of the minimum value, depending on whether the printing data is of R, G or B systems. Therefore, any possible change resulting from variation of the properties of the printing inks can be advantageously compensated for by the use of the achromatic color component divider 51 shown in FIG. 20.

Figure 21:
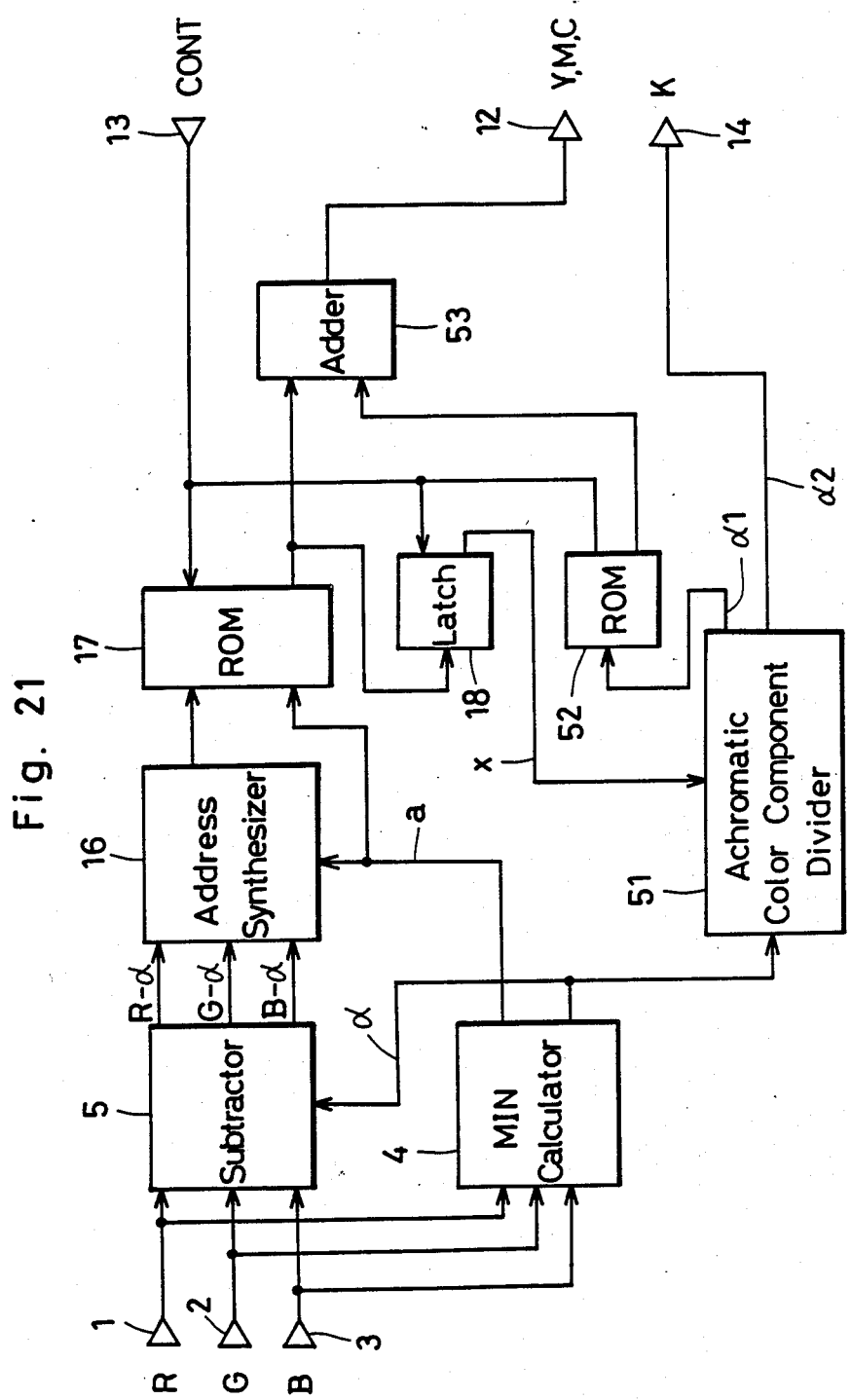

According to a further variant of the fifth embodiment shown in FIG. 21, ROM 17 used therein stores, for each address of each of the color components, a color system identifying data for, for example, the 4 bit color conversion data. When the color components are to be converted into the color conversion data, the identifying data x is read out from ROM 17 and is, after having been temporarily latched in the latch circuit 18, inputted to the achromatic color component divider 51. The achromatic color component divider 51 may be comprised of, for example, a read-only memory and stores many types of division data which are selectively specified by the identifying data x for use in dividing the achromatic color component $\alpha$ into the first and second achromatic color components $\alpha 1$ and $\alpha 2$.

In a still further variant shown in FIG. 22 of the fifth embodiment of the present invention, a single ROM 58 is used in place of a combination of the achromatic color component divider 51 and ROM 17 and 52 shown in and described with reference to FIG. 21. In other words, the use of the achromatic color component divider 51 and ROM 17 and 52 used in the circuit arrangement of FIG. 21 is replaced by the single ROM 58 in the variant shown in FIG. 22 so that the latter can take over all of the respective functions performed by the achromatic color component divider 51 and ROM 17 and 52.

Figure 22:
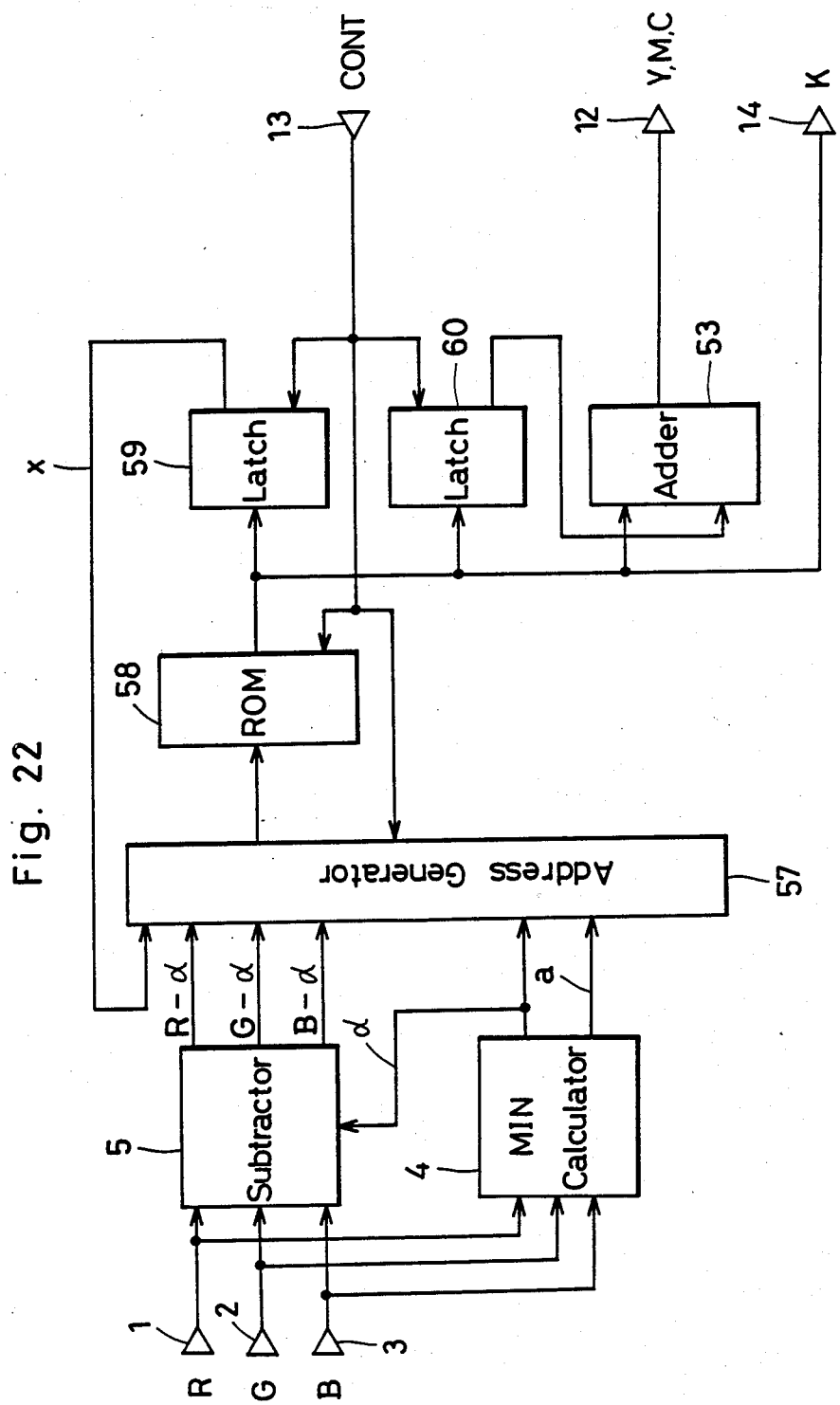

In FIG. 22, reference numeral 57 represents the address generator, and reference numerals 59 and 60 represent respective latch circuits.

In view of the fact that the resolving power of the human eyes is somewhat low with respect to color, the number of bits of each of the color components is reduced to 5 bits, in which case ROM 58 may have such contents as shown in FIG. 23. The color conversion performed by ROM 58 will now be described.

Assuming that the color conversion data k is outputted, others of the color components than the color component designated by the identifying signal a is so selected as to suit the address of ROM 58, and the identifying data x is read out from (A) in FIG. 23 for the subsequent temporary storage in the latch circuit 59. Then, the identifying data x so read out and the achromatic color component $\alpha$ are read by the address generator 57, and the color conversion data K is read out from (B) in FIG. 23 for the subsequent outputting to the output terminal 14. Since at this time the proportion of division of the achromatic color component $\alpha$ is specified by the identifying data x, the color conversion data K is equal to $\alpha 2$.

Thereafter, the color components are converted into the color conversion data Y1, M1 and C1. Similarly, the identifying data x and the achromatic color component $\alpha$ determined in a manner similar to that as hereinbefore described are selected by the address generator 57, and the appropriate color conversion data a are read out from (D) in FIG. 23, followed by the temporary storage in the latch circuit 60. This is equal to the color conversion data Y2, M2 and C2 which have been obtained by converting the achromatic color component $\alpha$. Thereafter, the color component identifying signal a is selected by the address generator 57, and an appropriate one of the color conversion data Y1, M1 and C1 is read from (C) in FIG. 23. Then, the adder 53 performs respective additions (Y1+Y2), (M1+M2) and (C1+C2), thereby providing the printing data Y, M and C to the output terminal 12.

As hereinbefore described, according to the fifth preferred embodiment of the present invention shown in FIGS. 21 and 22, since the color converting device is provided with the means for dividing the achromatic color component $\alpha$ into the two components at a proportion appropriate to compensate for the characteristic of the printing inks and also the printing characteristic, and since one of the two components so divided is converted into the color conversion data Y2, M2 and C2 while the other of the color components so divided is converted into the color conversion data K, the printing ink of a mixed color of yellow, magenta and cyan can be printed over the black printing ink deposit and, therefore, for example, a dark brown color can be substantially accurately reproduced at high color reproducibility.

Figure 24:
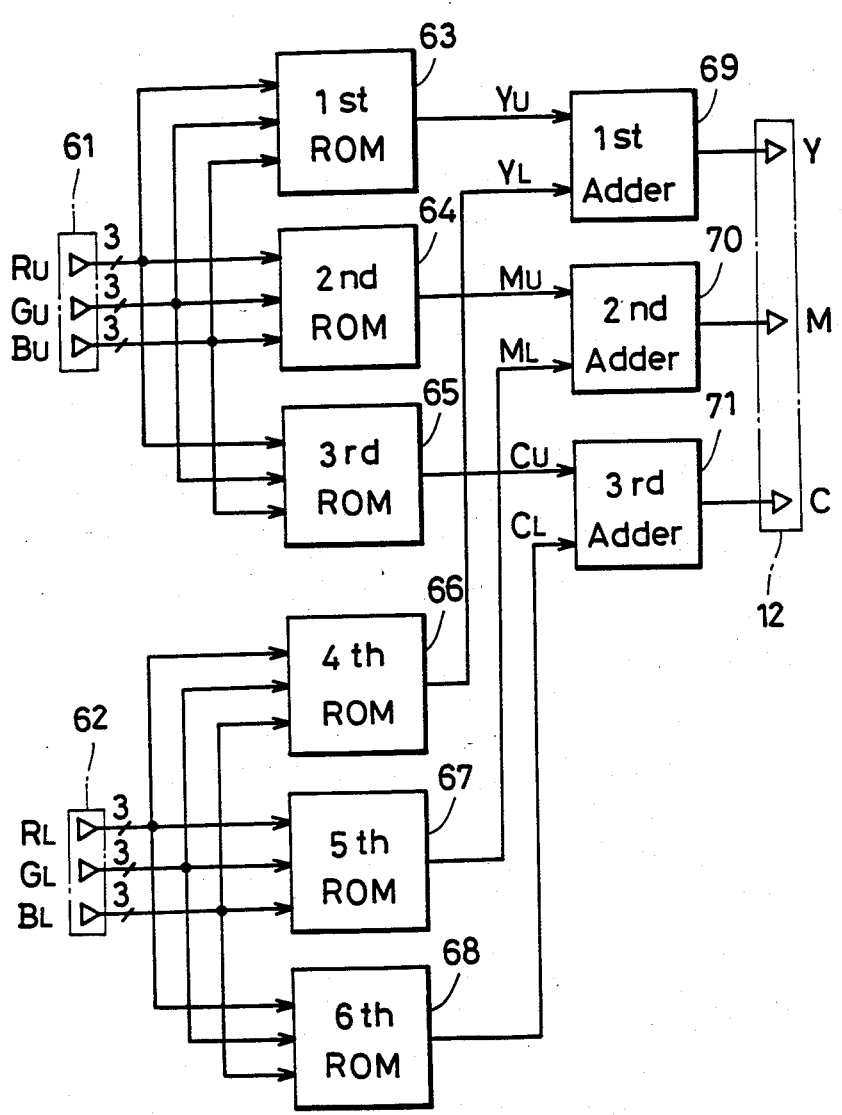
FIG. 24 is a circuit block diagrams showing the color converting device according to a sixth preferred embodiment of the present invention.

Referring now to FIG. 24, there is shown a circuit block diagram of the color converting device according to a sixth preferred embodiment of the present invention.

In FIG. 24, reference numeral 61 represents input terminals to which higher three bit image signals Ru, Gu and Bu of the respective 6 bit R, G and B image signals are applied, and reference numeral 62 represents input terminals to which lower three bit image signals RL, GL and BL of the respective 6 bit R, G and B image signals are applied. Reference numeral 63 represents a first ROM in which a partial color conversion data Yu corresponding to the image signals Ru, Gu and Bu is stored; reference numeral 64 represents a second ROM in which a partial color conversion data Mu corresponding to the image signals Ru, Gu and Bu is stored; reference numeral 65 represents a third ROM in which a partial color conversion data Cu corresponding to the image signals Ru, Gu and Bu is stored; reference numeral 66 represents a fourth ROM in which a partial color conversion data YL corresponding to the image signals RL, GL and BL is stored; reference numeral 67 represents a fifth ROM in which a partial color conversion data ML corresponding to the image signals RL, GL and BL is stored; and reference numeral 68 represents a sixth ROM in which a partial color conversion data CL corresponding to the image signals RL, GL and BL is stored. The number of addresses in each of the first to sixth ROMs 63 to 68 is 512 ($=2^9$).

Reference numeral 69 represents a first adder operable to perform an addition of Yu+YL=Y and then to output the printing data Y to the output terminal 12; reference numeral 70 represents a second adder operable to perform an addition of Mu+ML=Y and then to output the printing data M to the output terminal 12; and reference numeral 71 represents a third adder operable to perform an addition of Cu+CL=C and then to output the printing data C to the output terminal 12.

The color converting device of the construction shown in FIG. 24 operates in the following manner. The image signals Ru, Gu and Bu applied to the input terminals 61 are supplied to respective address terminals of the associated first to third 63, 64 and 65.

On the other hand, the image signals RL, GL and BL applied to the input terminals 62 are supplied to respective address terminals of the associated fourth to sixth ROMs 66, 67 and 68. Since each of the first to sixth ROMs 63 to 68 stores the corresponding desired partial color conversion data associated with the address locations, the partial color conversion data Yu, YL, Mu, ML and Cu, CL can be obtained after a predetermined access time. The first to third adders 69 to 71 calculate Y=Yu+YL, M=Mu+ML and C=Cu+CL, respectively, to provide the printing data Y, M and C to the output terminals 12.

Figure 30:
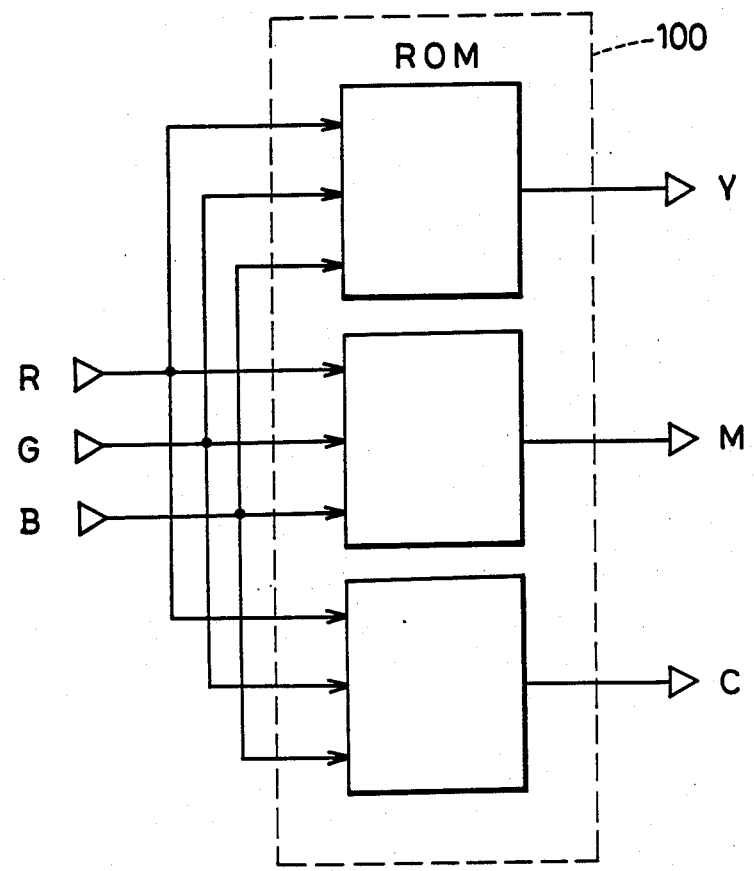

In this embodiment of FIG. 24, the number of addresses of each of the first to sixth ROMs is 512, and, since one address requires one byte that is 8 bits, the total memory capacity of these ROMs 63 to 68 is 24.576 kilobits, that is, 512 multiplied by 8 bits which is multiplied by the number of the first to sixth ROMs. This total memory capacity required in this embodiment is about 1/256 of that required in the prior art device shown in and described with reference to FIG. 30.

Although in the foregoing embodiment of FIG. 24 each of the R, G and B image signals has been divided into two aggregates, those in higher three significant bits and those in lower three significant bits, it may be divided into three or six aggregates with 2 bits or 1 bit each. An example in which each of the R, G and B image signals is divided into three aggregates is illustrated in FIG. 25 as a first variant of the sixth embodiment of the present invention.

Figure 25:
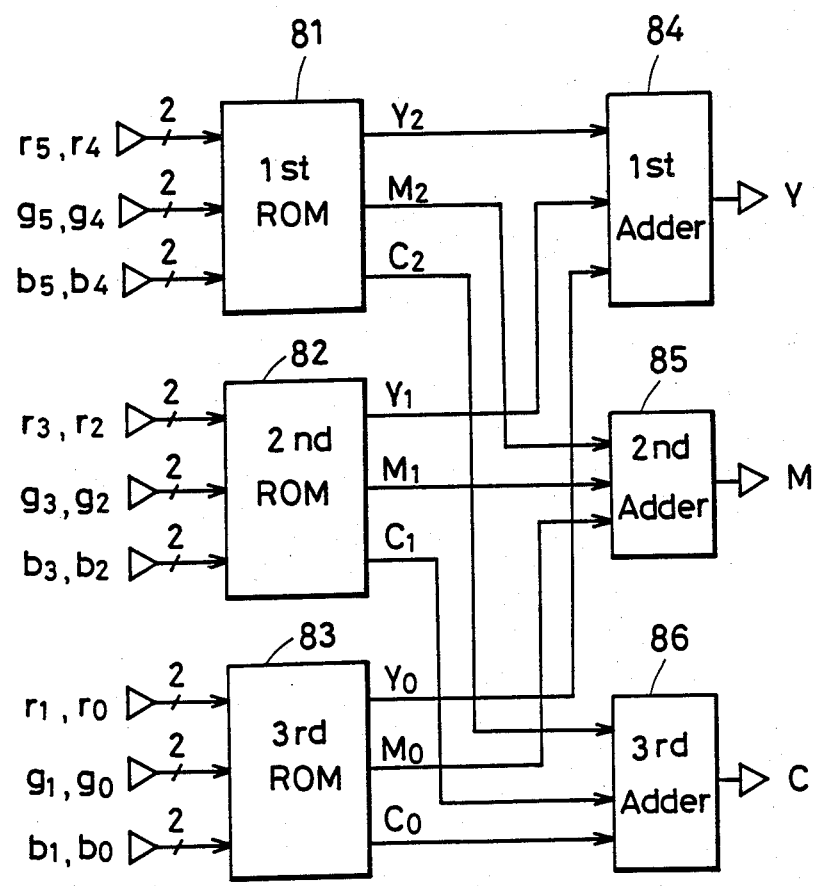
FIGS. 25 to 27 are circuit block diagrams showing respective variants of the color converting device of FIG. 24.

Referring to FIG. 25, reference numeral 81 represents a first ROM in which partial color conversion data Y2, M2 and C2 corresponding to higher two bit image signals r5, r4, g5, b5 and b4 of each of the 6 bit R, G and B signals are stored; reference numeral 82 represents a second ROM in which partial color conversion data Y1, M1 and C1 corresponding to intermediate two bit image signals r3, r2, g3, g2, b3 and b2 of each of the same R, G and B signals are stored; and reference numeral 83 represents a third ROM in which partial color conversion data Y0, M0 and C0 corresponding to lower two bit image signals r1, r0, g1, g0, b1 and b0 of each of the same R, G and B signals are stored. Each of the first to third ROMs 81 to 83 has 64 ($=2^6$) addresses.

Reference numeral 84 represents a first adder operable to carry out an addition of Y2+Y1+Y0=Y and then to provide the printing data Y; reference numeral 85 represents a second adder operable to carry out an addition of M2+M1+M0=M and then to provide the printing data M; and reference numeral 86 is operable to carry out an addition of C2+C1+C0=C and then to provide the printing data C.

Even in this variant of FIG. 25, it is obvious that, as is the case with the circuit arrangement shown in FIG. 24, the R, G and B image signals can be converted into the printing data Y, M and C.

The total memory capacity required in the variant of FIG. 25 is 4.608 kilobits, that is, $2^6$ (the number of addresses)×3 (the number of colors)×8 (the number of bits)×3 (the number of division). Although the greater the number of each of the R, G and B signals divided, the greater the number of inputs to the adders and, hence, the number of required circuit components, however, the total required memory capacity can be advantageously reduced.

A similar description can equally apply even where each of the R, G and B signals is divided into 6 aggregates, in which case the total memory capacity of read-only memories will be 1.152 kilobits, that is, $2^3$ (the number of addresses)×3 (the number of colors)×8 (the number of bits)×6 (the number of division). However, where the division by 6 requires the use of an increased number of the adders for summing the six partial color conversion data together, which in turn results in the increased time required for the adders to perform the respective calculations. Also, any possible error may occur in result of addition performed by the adder, because the data which has originally been one is divided into a plurality of components which are then summed together. In view of the foregoing, the proportion of division has to be determined in consideration of the memory capacity of each of ROMs used, the number of the logic circuits to be composed and requirements, the time required to perform calculations, and/or the conversion efficiency and accuracy.

In another variant, shown in FIG. 26, of the sixth preferred embodiment of the present invention, a seventh ROM 73 and a fourth adder 72 are additionally provided in a circuit arrangement identical with that shown in and described with reference to FIG. 24.

The seventh ROM 73 has its address terminals to which higher 3 bit image signals Ru, Gu and Bu of each of the R, G and B image signals are applied so that a correction value x for each of the lower 3 bit image signals RL, GL and BL of each of the R, G and B signals can be outputted therefrom. The correction value x is comprised of correction values r, g and b for each of the image signals RL, GL and BL, each of said correction values r, g and b being composed of a polarity code ("+" for emphasis and "−" for reduction) and a three-bit value code.

The fourth adder 72 carries out respective additions of R°L=RL+r, G°L=GL+g and B°L=BL+b thereby to provide lower 3-bit image signals R°L, G°L and B°L which have been corrected, to the address terminals of the fourth to sixth ROMs 66 to 68. Then, the partial color conversion and the addition similar to those described in connection with the embodiment of FIG. 24 take place to provide the printing data Y, M and C.

The memory capacity required of the seventh ROM 73 is 6.144 kilobits ($=2^9 \times 3 \times 4$) since the three types of data each being of 4 bits per address are required with the total number of the addresses being $2^9$. It is, however, to be noted that the read-only memory now available in the market is generally of a structure having a memory capacity expressed in unit of byte, that is, 8 bits, and, therefore, if this type of ROM is used, the required memory capacity will be 12.288 kilobits.

On the other hand, the fourth adder 72 utilizable in the practice of the present invention may be of a structure having about 200 gates. In the variant shown in FIG. 26, a slightly increased memory capacity of ROM and addition of a minimized number of the circuit components ensure (1) the correction of the color conversion data appropriate to a combination of data of picture elements, and (2) the adjustment of the flesh color, and therefore, the color conversion with minimized error in conversion can be accomplished.

Figure 26:
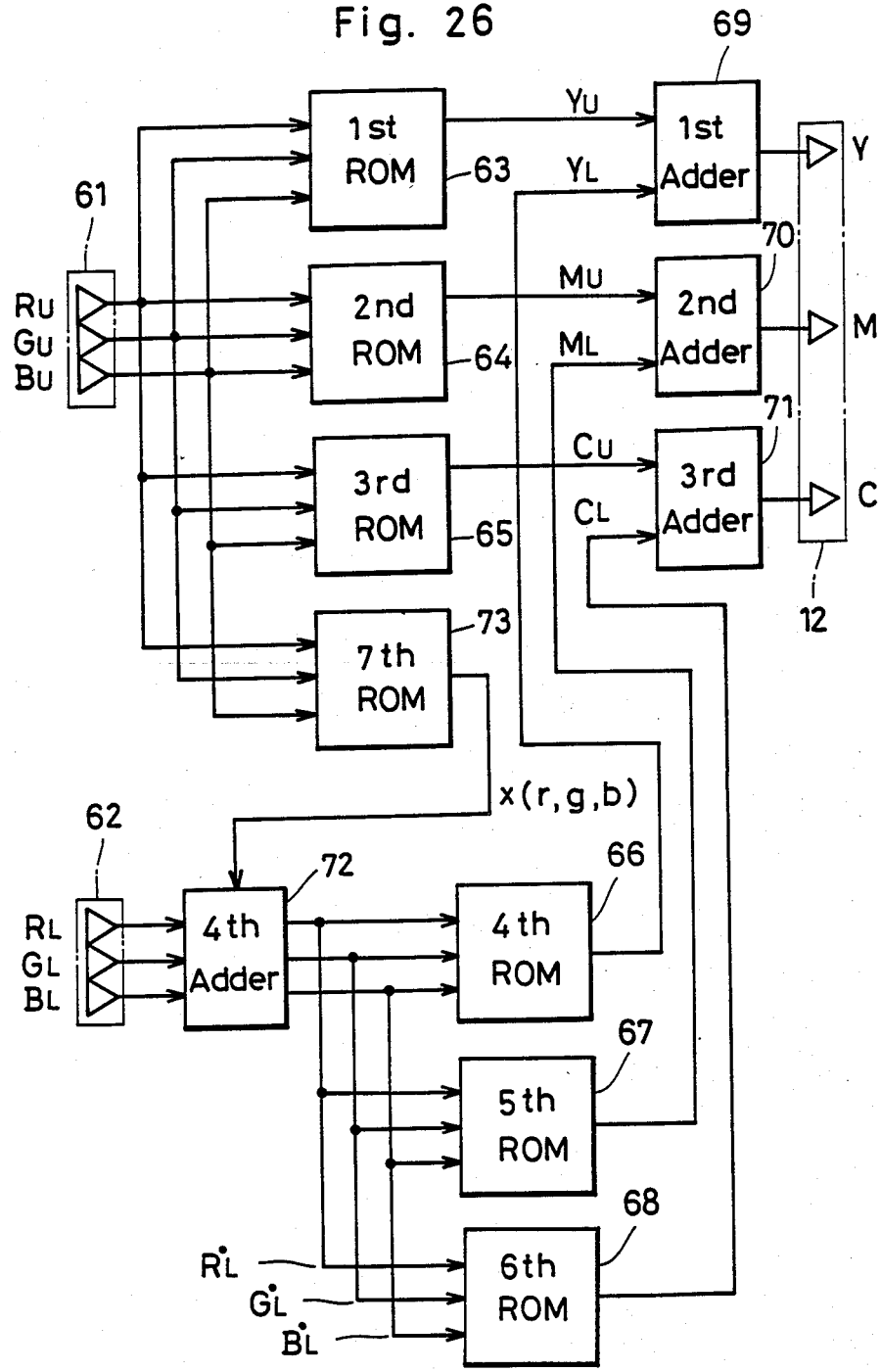
Figure 27:
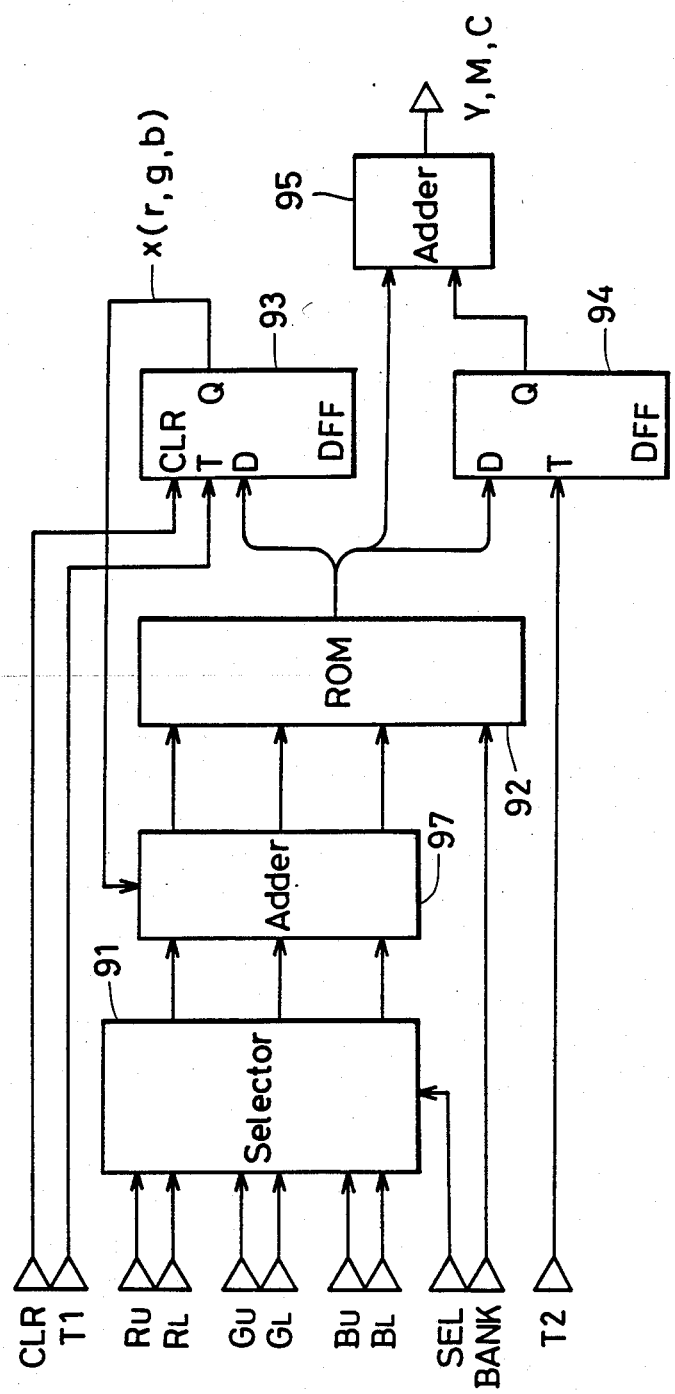

While in the embodiments of FIGS. 24 to 26 the read-only memories and the adders have been shown as connected parallel to each other, a series-connected arrangement may be employed to accomplish similar features such as shown in FIG. 27 in which like reference numerals are used to denote like components shown in FIG. 26.

Referring now to FIG. 27, reference numeral 91 represents a selector adapted to be controlled by a SEL signal to selectively output a set of image signals out from two sets of image signals Ru, Gu and Bu, RL, GL and BL; reference numeral 92 represents ROM storing the table conversion data Yu, Mu and Cu, YL, ML and CL, and r, g and b at predetermined address locations; reference numerals 93 and 94 represent first and second D-type flip-flops for the storage of outputs from ROM 92, respectively. All of CLR, T1, T2, SEL and BANK signals shown in FIG. 27 are a control signal externally applied to the circuit arrangement of FIG. 27 to operate the color converting device shown therein.

In operation the selector 91 is controlled by the SEL signal to select and output the higher 3 bit image signals Ru, Gu and Bu out from the two sets of the image signals Ru, Gu and Bu, RL, GL and BL which have been inputted thereto. At this time, the flip-flop 93 is set to "0" by the CLR signal and will, therefore, not output the correction value x. Since the correction value x is not generated from the flip-flop 93 to an adder 97, the adder allows the signals Ru, Gu and Bu to pass therethrough to ROM 92. ROM 92 is sequentially switched over by the BANK signal to output correction values r, g and b by means of the table conversion effected with the application thereto of the 9 bit image signals Ru, Gu and Bu, as the address signals, which are supplied from the adder 97. The flip-flop 93 when controlled by the T1 signal stores temporarily the correction values r, g and b which are successively supplied thereto. Subsequently ROM 92 is controlled by the BANK signal to effect the table conversion of Yu which is temporarily stored in the flip-flop 94. The flip-flop 93 is then supplied with the CLR signal to release the flip-flop 93 from a cleared condition so that the correction values r, g and b can be outputted therefrom. Thereafter, the selector 91 is switched over by the SEL signal so that the lower 3 bit signals RL, GL and BL can be supplied to the adder 97 which in turn outputs respective results of addition of R°L=RL+r, G°L=GL+g and B°L=BL+b to ROM 92. ROM 92 instructed by the BANK signal outputs YL which is applied to the adder 95. The adder 95 then carries out an addition to sum YL together with Yu, which has been temporarily stored in the flip-flop 94, to provide the printing data Y (=Yu+YL). In a similar method, the printing data M and C are successively converted in color.

Figure 28:
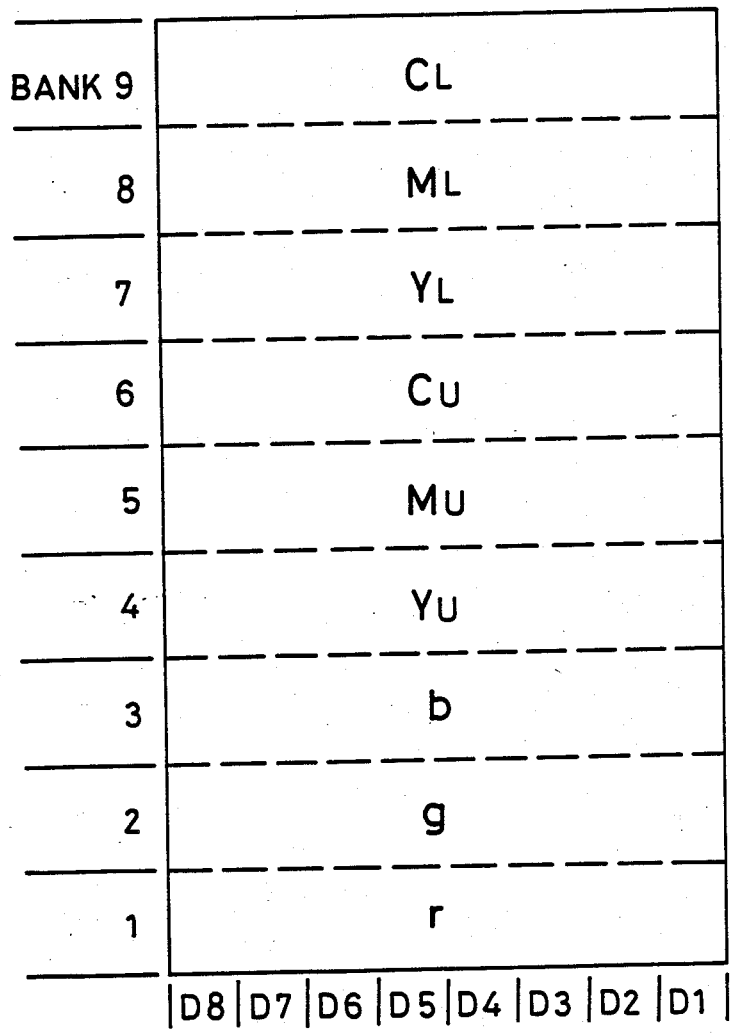
FIG. 28 is a diagram showing the contents stored in the read-only memory used in the color converting device of FIG. 26.
Figure 29:
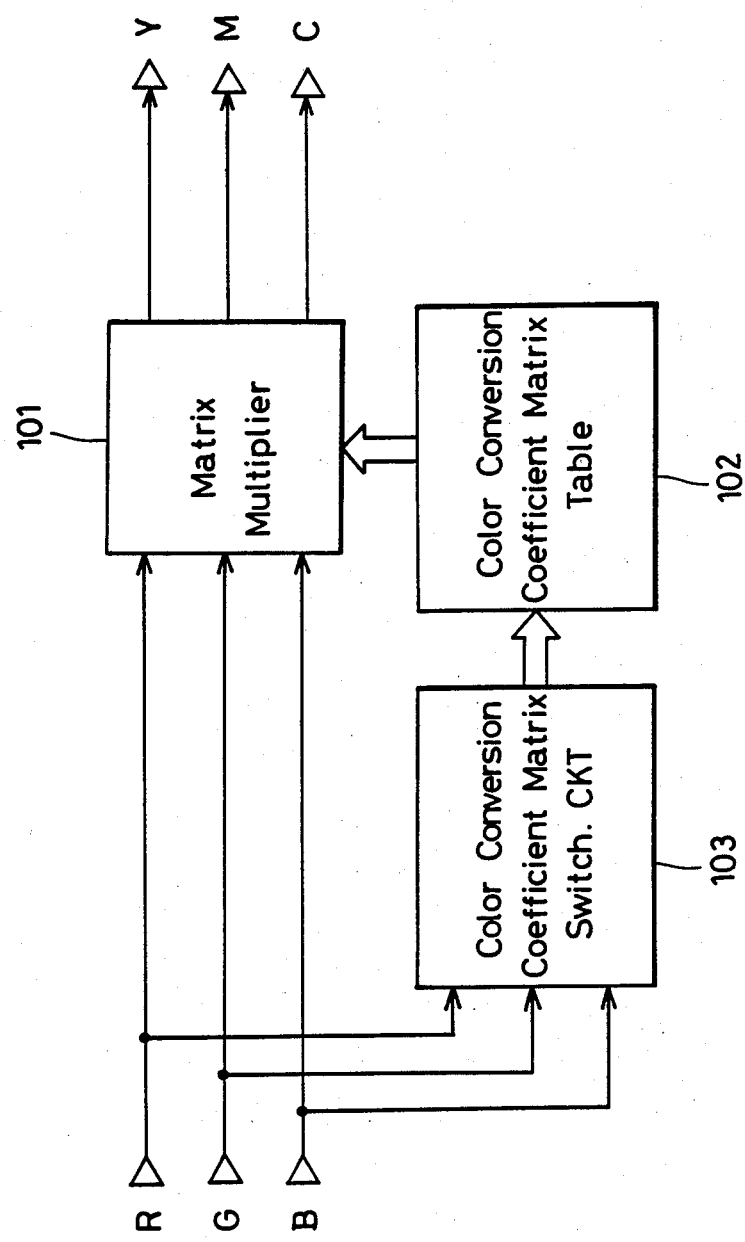
FIGS. 29 and 30 are circuit block diagrams showing the respective prior art color converting devices.

FIG. 28 illustrates the bank structure used in the variant of FIG. 27, and the associated data. For each bank, the number of addresses is $2^9=512$, and $2^9 \times 9$ (the number of banks)$\times 8$ (the number of bits)=36,864 bits is the memory capacity of ROM 92 used in the circuit arrangement of FIG. 27.

While in the circuit arrangement of FIG. 27 the signals have been shown as processed in sequence through the selector 91 and then through the adder 97, the both may be reversed in position. More specifically, the image signals RL, GL and BL may be supplied to one input terminals of the adder 97 having the other input terminals adapted to receive the r, g and b signals, so that the result of addition performed thereby can be supplied to the selector 91. It is however, to be noted that, in this possible circuit arrangement, the Ru, Gu and Bu signals are to be supplied direct to the selector 91 without passing through the adder 97. In such case, the use of the CLR signal may be obviated.

As is the case with any one of the foregoing embodiments and variants, each of the R, G and B signal may be a 7 or 8 bit signal.

While reference has been made to the three color conversion, the concept of the present invention can be equally applicable even where the four color conversion (Y, M, C and K) is desired.

In addition, the number of bits of the divided aggregated may not be the same, and the division into aggregates one having higher two bits and the other having lower 4 bits may be equally employed in the practice of the present invention.

As hereinbefore fully described, since the R, G and B signals are grouped into a plurality of aggregates so that the signals in each aggregate may have the same number of bits and the addition is effected for the printing signal data for each color after the partial color conversion of the signals of each of the aggregates, thereby to provide the three or four color printing data, the color converting device can be obtained wherein the required memory capacity of ROM is substantially reduced without adversely affecting the precision.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A color converting device for converting R, G and B image signals representing red, green and blue colors, respectively, into three color printing data indicative of the colors yellow, magenta and cyan, which device comprises:
   first dividing means for dividing the image signals into achromatic and chromatic color components for each picture element;
   first converting means for converting the chromatic color components so divided into first color conversion data Y1, M1 and C1 representative of the colors yellow, magenta and cyan, respectively;
   second converting means for converting the achromatic color component into second color conversion data Y2, M2 and C2;
   adder means for summing the first and second color conversion data Y1, M1, C1, Y2, M2 and C2 together to provide said three color printing data;
   wherein said first dividing means further comprises, detecting means for detecting one of the R, G and B image signals which is of a minimum value for each picture element and for extracting the minimum value as an achromatic color component $\alpha$ and for outputting an identifying signal a indicative of the image signal of said minimum value, and
   extracting means for subtracting the achromatic color component $\alpha$ from each of the R, G and B image signals and for extracting the differences $R-\alpha$, $G-\alpha$ and $B-\alpha$ as red, green and blue color components of such image signals; and
   wherein said first converting means further comprises, matrix generating means for generating a color conversion coefficient matrix defined for each region of yellow, magenta and cyan in response to said identifying signal a so that optimum color reproducibility can be attained, and
   means for selecting the color conversion coefficient matrices for the regions to which the color component to be converted belongs and for subsequently converting into the first color conversion data Y1, M1 and C1 by means of a calculation utilizing the selected color conversion coefficient matrices.

2. The color converting device as defined in claim 1, wherein
   said matrix generating means generates a color conversion coefficient matrix defined for each region of yellow, magenta and cyan in response to a combination of the identifying signal a and the differences $R-\alpha$, $G-\alpha$, and $B-\alpha$ so that an optimum color reproducibility can be attained.

3. The color converting device as claimed in claim 1, wherein said second converting means comprises means for converting the achromatic color component $\alpha$ into said second color conversion data Y2, M2 and C2 in response to said identifying signal a.

4. The color converting device as claimed in claim 1, wherein said second converting means comprises:
   means for subtracting from the achromatic color component for each picture element an achromatic color component which would be included in the first color conversion data because of the lack of pure color in a printing ink, thereby to provide a difference signal; and
   means for converting the difference signal into the achromatic color component for the particular picture element.

5. A color converting device for converting R, G and B image signals representing red, green and blue colors, respectively, into three color printing data indicative of the three colors of yellow, magenta and cyan, which device comprises:
   first dividing means for dividing the image signals into achromatic and chromatic color components for each picture element;
   first converting means for converting the divided chromatic color components into first color conversion data Y1, M1 and C1 representative of the colors yellow, magenta and cyan, respectively;
   second converting means for converting the divided achromatic color component into second color conversion data Y2, M2 and C2; and
   output processing means for synthesizing and summing or selecting the color conversion data for output;
   wherein said first dividing means further comprises,
   detecting means for detecting one of the R, G and B image signals which is of a minimum value for each picture element and for extracting said minimum value as an achromatic color component $\alpha$ and for outputting an identifying signal a indicative of an image signal of said minimum value, and
   extracting means for subtracting the achromatic color component $\alpha$ from each of the R, G and B image signals and for providing the difference values of $R-\alpha$, $G-\alpha$, and $B-\alpha$ as red, green and blue color components of such image signals,
   wherein said first converting means further comprises,
   address synthesizer means for synthesizing the chromatic color components into an address signal b in response to the identifying signal a, and
   first memory means for storing color conversion data for the yellow, magenta and cyan colors in correspondence with the address signal b for the chromatic color components;
   wherein the second converting means comprises,
   second memory means for storing said color conversion data for yellow, magenta and cyan colors in correspondence with the achromatic color component α, and wherein the color converting device further comprises, table conversion means for extracting the respective color conversion data from said first memory means on the basis of the address signal b and from the second memory means on the basis of the achromatic color component α.

6. The color converting device as claimed in claim 5, whereing the number of bits of the chromatic color components obtained by the first dividing means is smaller than the number of bits of the achromatic color component α.

7. The color converting device as claimed in claim 5 wherein said second converting means further comprises:

means for subtracting from the achromatic color component α for each picture element an achromatic color component included in the first color conversion data Y1, M1 and C1 due to the lack of pure color in a printing ink and generating a difference signal therefrom, and wherein said second memory means stores color conversion data for said yellow, magenta and cyan colors corresponding to said difference signal.

8. The color converting device as claimed in claim 5, wherein said address synthesizer means subjects the address signal a to a bit plane division to provide a plurality of address signals b, and wherein the first memory means comprises a look up conversion table and respective means for converting the plurality of address signals b into respective partial color conversion data by means of said conversion table; and wherein the first converting means further comprises means for synthesizing and summing said partial color conversion data together.

9. A color converting device for converting R, G and B image signals representing red, green and blue colors, respectively, into three color printing data indicative of the three colors yellow, magenta and cyan, which device comprises:

first dividing means for dividing the image signals into achromatic and chromatic color components for each picture element;

first converting means for converting the divided chromatic color components into a first color conversion data Y1, M1 and C1 representative of the yellow, magenta and cyan colors, respectively;

second converting means for converting the achromatic color component into a second color conversion data Y2, M2 and C2;

adder means for summing the first and second color conversion data Y1, M1, C1, Y2, M2 and C2 together to provide three color printing data; and wherein said first converting means further comprises, separating means for separating the R, G and B image signals into an achromatic color component α, a first chromatic color component β and a second chromatic color component γ, the first chromatic color component β being the smaller value of one of the two color components from which the achromatic color component α has been subtracted, while the second chromatic color component γ is the value of the subtraction of the first chromatic color component from the greater value of one of the two color components from which the achromatic color component has been subtracted, means for converting the first and second chromatic color components into first and second partial color conversion data for yellow, magenta and cyan, respectively, in accordance with a table conversion, and means for synthesizing and summing the first and second partial color conversion data together.

10. The color converting device as claimed in claim 7, wherein the first dividing means comprises:

subtracting means for performing the respective calculations of (R−G), (G−B) and (B−R) to provide associated difference outputs;

discriminating means for determining, with reference to said difference outputs, the R, G and B image signals which exhibit maximum and minimum values, respectively;

first output means for outputting as the achromatic color component α the image signal which has exhibited a minimum value;

second output means for selecting, from the difference outputs, a value equal to an intermediate value between the maximum and minimum values less the minimum value and for outputting such value as the first chromatic color component β; and third output means for selecting, from the difference outputs, a value equal to the maximum value less said intermediate value and for outputting such value as the second chromatic color component γ.

11. The color converting device as claimed in claim 10, and further comprising:

correcting means for correcting any possible error in lightness which would result from the characteristics of a printing ink in the event that the printing is effected on the basis of partial color conversion data of the first and second chromatic color components β and γ by correcting the partial color conversion data, said correcting means including, first generating means for generating a first correction signal k1 necessary to determine the amount of correction to be effected on the partial color conversion data of the first chromatic color component β in dependence on the value of the second chromatic color component γ obtained at the time of the conversion of such second chromatic color component into the partial color conversion data, and second generating means for generating a second correction signal k2 necessary to determine the amount of correction to be effected to the partial color conversion data of the achromatic color component α when the first chromatic color component β is converted into said partial conversion data.

12. A color converting device for converting R, G and B image signals representing the colors red, green aand blue, respectively, into four color printing data indicative of the four colors of yellow, magenta, cyan and black, and which device comprises:

first dividing means for dividing the image signals into achromatic and chromatic color components for each picture element;

first converting means for converting the divided chromatic color components into a first color conversion data Y1, M1 and C1 representative of the yellow, magenta and cyan colors, respectively;

second converting means for converting the achromatic color components into a second color conversion data Y2, M2, and a third color conversion data K;

adder means for summing the first and second color conversion data Y1, M1, C1, Y2, M2, and C2 together to provide three color printing data;

wherein said first dividing means further comprises, detecting means for detecting one of the R, G and B image signals having a minimum value for each picture element and for extracting the minimum value as an achromatic color component $\alpha$ and for outputting an identifying signal a indicative of the image signal of said minimum value, and extracting means for subtracting the achromatic color component from each of the R, G and B image signals and for extracting the differences $R-\alpha$, $G-\alpha$, and $B-\alpha$ as red, green and blue color components of such image signals;

wherein the first converting means further comprises, an address synthesizer for synthesizing the chromatic color components into an address signal b utilizing the identifying signal a, and first memory means for storing color conversion data for the yellow, magenta and cyan colors in correspondence with the address signal b for the chromatic color components;

wherein the second converting means further comprises, second dividing means for dividing the achromatic color component $\alpha$ into a first and a second sections and for outputting the second section as the third conversion data K, and second memory means for storing color conversion data for yellow, magenta and cyan colors in correspondence with the first section of the achromatic color component $\alpha$, and wherein the color converting device further comprises, table conversion means for extracting the first color converstion data Y1, M1 and C1 from the first memory means on the basis of the address signal b and the second color conversion data Y2, M2 and C2 from the second memory means on the basis of the first section of the achromatic color component $\alpha$.

13. The color converting device as claimed in claim 12, wherein said second dividing means comprises:

detecting means for detecting when the R, G and B image signals contain only the achromatic color component $\alpha$; and means for converting into data K the data associated with the color black in response to an output signal generated by said detecting means.

14. The color converting means as claimed in claim 12, wherein said second dividing means discriminates to which one of red, green and blue color systems the R, G and B image signals belong by utilizing the identifying signal a and determines.

15. The color converting device as claimed in claim 12, wherein said second dividing means comprises:

means for designating a plurality of specifying data according to the respective values of the chromatic color components $R-\alpha$, $G-\alpha$, $B-\alpha$ extracted by said extracting means; and means for determining the proportion of division of the achromatic color component according to said specifying data.

* * * * *